(12) United States Patent
Shiiyama

(10) Patent No.: US 7,305,151 B2
(45) Date of Patent: Dec. 4, 2007

(54) IMAGE PROCESSING APPARATUS AND METHOD THEREFOR

(75) Inventor: Hirotaka Shiiyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 680 days.

(21) Appl. No.: 10/828,175

(22) Filed: Apr. 21, 2004

(65) Prior Publication Data

US 2004/0218837 A1 Nov. 4, 2004

(30) Foreign Application Priority Data

Apr. 30, 2003 (JP) .............................. 2003-125813

(51) Int. Cl.
*G06K 9/54* (2006.01)
*G06K 9/00* (2006.01)
*G06K 9/60* (2006.01)

(52) U.S. Cl. ...................................... 382/305; 382/162

(58) Field of Classification Search ................ 382/305, 382/162, 165, 195, 274, 294, 307
See application file for complete search history.

(56) References Cited

U.S. PATENT DOCUMENTS

| 5,751,286 A | 5/1998 | Barber et al. ................ 715/835 |
| 5,917,940 A | 6/1999 | Okajima et al. ............ 382/173 |
| 6,181,818 B1 | 1/2001 | Sato et al. ................... 382/170 |
| 6,665,442 B2 * | 12/2003 | Sekiguchi et al. .......... 382/224 |
| 6,792,164 B2 * | 9/2004 | Syeda-Mahmood ......... 382/305 |

FOREIGN PATENT DOCUMENTS

| CN | 1329323 | 1/2002 |
| CN | 1341247 | 3/2002 |
| CN | 1413458 | 4/2003 |
| JP | 8-249349 A | 9/1996 |
| JP | 2001-257862 A | 9/2001 |
| WO | WO 00/46748 | 8/2000 |

* cited by examiner

*Primary Examiner*—Yon J. Couso
(74) *Attorney, Agent, or Firm*—Fitzpatrick, Cella, Harper & Scinto

(57) ABSTRACT

Brightness feature information on the brightness of an image to be processed is extracted, and color feature information on the color of the image is extracted. A determination unit determines whether color information of the image to be processed is sufficient. When color information of a reference comparison image is sufficient as a result of determination, a color feature information comparison unit performs a similarity comparison between color feature information of the reference comparison image and that of a target comparison image. When the color information of the reference comparison image is insufficient, a brightness feature information comparison unit performs a similarity comparison between brightness feature information of the reference comparison image and that of the target comparison image. A retrieval result display displays an image serving as a retrieval result on the basis of the comparison result.

25 Claims, 28 Drawing Sheets

FIG. 2

| IMAGE ID | FILE NAME | DATE |
|---|---|---|
| 0000001 | C:¥img¥ship.bmp | 2002/12/19 |
| 0000002 | C:¥img¥car.bmp | 2002/12/20 |
| 0000003 | C:¥img¥watch.bmp | 2002/12/21 |

FIG. 3

| IMAGE ID | BRIGHTNESS FEATURE INFORMATION |
|----------|-------------------------------|
| 0000001  | · · · · · ·                   |
| 0000002  | · · · · · ·                   |
| 0000003  | · · · · · ·                   |

FIG. 4

| IMAGE ID | COLOR FEATURE INFORMATION |
|---|---|
| 0000001 | · · · · · · |
| 0000002 | · · · · · · |
| 0000003 | · · · · · · |

FIG. 8

| RANK ID | 0 | 1 | 2 | 3 | 4 | ~ | 15 | 16 |
|---|---|---|---|---|---|---|---|---|
| RANGE | 0–15 | 16–31 | 32–47 | 48–63 | 64–79 | ~ | 222–238 | 239–255 |

FIG. 18

|   | 1 | 2 | 3 | 4 | 5 | 6 | 7 | 8 | ... |
|---|---|---|---|---|---|---|---|---|-----|
| 1 | 0 | 1 | 1 | 5 | 1 | 5 | 7 | 7 | ... |
| 2 |   | 0 | 2 | 1 | 1 | 7 | 2 | 5 | ... |
| 3 |   |   | 0 | 7 | 1 | 1 | 5 | 2 | ... |
| 4 |   |   |   | 0 | 1 | 9 | 1 | 7 | ... |
| : |   |   |   |   |   |   |   |   |     |

FIG. 22

|   | 1 | 2 | 3 | 4 | 5 | 6 | 7 | 8 | .... |
|---|---|---|---|---|---|---|---|---|------|
| 1 | 0 | 8 | 16 | 24 | 32 | 40 | 48 | 56 | .... |
| 2 |   | 0 | 8 | 16 | 24 | 32 | 40 | 48 | .... |
| 3 |   |   | 0 | 8 | 16 | 24 | 32 | 40 | .... |
| 4 |   |   |   | 0 | 8 | 16 | 24 | 32 | .... |
| : |   |   |   |   |   |   |   |   |      |

FIG. 28

| IMAGE ID | FULL PATH FILE NAME | DATE | COLOR INFORMATION FLAG |
|---|---|---|---|
| 0000001 | C:¥img¥ship.bmp | 2002/12/19 | 1 |
| 0000002 | C:¥img¥car.bmp | 2002/12/20 | 0 |
| 0000003 | C:¥img¥watch.bmp | 2002/12/21 | 1 |

IMAGE PROCESSING APPARATUS AND METHOD THEREFOR

FIELD OF THE INVENTION

The present invention relates to an image processing technique of performing a similar image retrieval process based on the similarity between a reference comparison image serving as a retrieval condition and a target comparison image, and an image registration process for an image subjected to similar image retrieval.

BACKGROUND OF THE INVENTION

There have conventionally been proposed many similar image retrieval methods using color information and brightness information as image feature amounts. In similar image retrieval using color information (to be referred to as color information retrieval hereinafter), color information is extracted in a registration process for an image subjected to similar image retrieval and image retrieval using an image serving as a retrieval condition. In similar image retrieval using brightness information (brightness information retrieval), brightness information is extracted in a registration process for an image subjected to similar image retrieval and image retrieval using an image serving as a retrieval condition. That is, color information retrieval and brightness information retrieval are realized by independent systems.

Japanese Patent Laid-Open No. 8-249349 discloses an arrangement in which an image is segmented into blocks and pixels in each block are projected into a subspace (color bin) in the color space and the mode color is obtained to calculate an image feature amount.

When an image to be retrieved by color information retrieval is a monochrome or grayscale image, the grayscale region in the color space which expresses the color of the image is merely the region of a line from white to black within the color space. When the color histogram of each block obtained by segmenting an image is generated to extract more accurate color information, blocks assigned to the region of the line from white to black along the grayscale direction are much smaller in number than blocks assigned to another region within the color space. When a monochrome or grayscale image is registered under this condition, the information amount of color information inevitably decreases, and the retrieval precision in retrieval greatly decreases.

When an image to be retrieved by brightness information retrieval is a color image, the grayscale region in the color space which expresses the brightness of the image is merely the region of a line from white to black within the color space, and the brightness information is an 8 quantization (step) expression at most. To the contrary, color information enables a 24-bit expression, and even the same brightness of a color image can be represented by an infinite number of color combinations. It is therefore impossible to accurately retrieve an image whose color coincides with that of a retrieval condition image in retrieving a color image by brightness information retrieval.

As described above, there is no retrieval technique which compensates for the disadvantages of brightness information retrieval and color information retrieval and exploits their advantages.

SUMMARY OF THE INVENTION

The present invention has been made to overcome the conventional drawbacks, and has as its object to provide an image processing technique capable of retrieving an image at high precision regardless of the type of image.

According to the present invention, the foregoing object is attained by providing an image processing apparatus which retrieves a similar image on the basis of a similarity between a reference comparison image serving as a retrieval condition and a target comparison image, comprising:

brightness feature information extraction means for extracting brightness feature information on a brightness of an image to be processed;

color feature information extraction means for extracting color feature information on a color of the image to be processed;

determination means for determining whether color information of the image to be processed is sufficient;

comparison means for, when color information of the reference comparison image is sufficient as a result of determination by the determination means, performing a similarity comparison between color feature information of the reference comparison image and color feature information of the target comparison image, and when the color information of the reference comparison image is insufficient, performing a similarity comparison between brightness feature information of the reference comparison image and brightness feature information of the target comparison image; and output means for outputting an image serving as a retrieval result on the basis of a comparison result of the comparison means.

In a preferred embodiment, when the color information of the reference comparison image and color information of the target comparison image are sufficient as a result of determination by the determination means, the comparison means performs a similarity comparison between the color feature information of the reference comparison image and the color feature information of the target comparison image, and when at least one of the color information of the reference comparison image and the color information of the target comparison image is insufficient, performs a similarity comparison between the brightness feature information of the reference comparison image and the brightness feature information of the target comparison image.

In a preferred embodiment, the determination means comprises analysis means for analyzing a color of a pixel of the reference comparison image, and the determination means determines whether the color information of the reference comparison image is sufficient, on the basis of an analysis result of the analysis means.

In a preferred embodiment, when a data format of the reference comparison image corresponds to a color image, the determination means determines that the color information of the reference comparison image is sufficient, and when the data format corresponds to a monochrome or grayscale image, determines that the color information of the reference comparison image is insufficient.

In a preferred embodiment, the analysis means analyzes a ratio of the color information to the reference comparison image.

In a preferred embodiment, the analysis means analyzes a ratio of a color difference component value to a luminance component value in an average color of all pixels which form the reference comparison image or a reduced image of the reference comparison image.

In a preferred embodiment, the analysis means comprises generation means for generating a color histogram of color bins by projecting density values of all pixels which form the reference comparison image or a reduced image of the reference comparison image, into the color bins serving as subspaces prepared by dividing a color space, and calculation means for calculating a ratio of the number of pixels belonging to a color bin in a grayscale direction to a total number of pixels of the reference comparison image.

In a preferred embodiment, the brightness feature information includes information which makes a brightness rank corresponding to a mode brightness in a brightness histogram in each block prepared by segmenting the reference comparison image into a plurality of blocks and position information of the block correspond to each other.

In a preferred embodiment, the brightness feature information includes information which makes an average brightness in each block prepared by segmenting the reference comparison image into a plurality of blocks and position information of the block correspond to each other.

In a preferred embodiment, the brightness feature information includes information which makes a brightness rank corresponding to an average brightness in each block prepared by segmenting the reference comparison image into a plurality of blocks and position information of the block correspond to each other.

In a preferred embodiment, the color feature information includes information which makes a color bin ID corresponding to a mode color in a color histogram in each block prepared by segmenting the reference comparison image into a plurality of blocks and position information of the block correspond to each other.

In a preferred embodiment, the color feature information includes information which makes an average color in each block prepared by segmenting the reference comparison image into a plurality of blocks and position information of the block correspond to each other.

In a preferred embodiment, the color feature information includes information which makes a color bin ID corresponding to an average color in each block prepared by segmenting the reference comparison image into a plurality of blocks and position information of the block correspond to each other.

In a preferred embodiment, the brightness feature information extraction means extracts the brightness feature information on the basis of a histogram obtained by ranking or quantizing a brightness histogram of each block prepared by segmenting the reference comparison image into a plurality of blocks, the color feature information extraction means extracts the color feature information on the basis of a color histogram of color bins obtained by projecting density values of all pixels which form each block prepared by segmentation into a plurality of blocks, into color bins serving as subspaces prepared by dividing a color space, and the number of ranks or the number of quantization steps in ranking or quantization by the brightness feature information extraction means is larger than the number of bins in a grayscale direction of the color bins in the color feature information extraction means.

In a preferred embodiment, the color feature information extraction means extracts color feature information on the color of the reference comparison image even when the reference comparison image serving as the image to be processed is a monochrome or grayscale image.

In a preferred embodiment, the apparatus further comprises registration means for registering an image serving as the reference comparison image in an image storage, wherein when the reference comparison image serving as the image to be processed is a monochrome or grayscale image, the color feature information extraction means extracts color feature information on a color of a converted image obtained by converting the reference comparison image into a color image.

In a preferred embodiment, the brightness feature information extraction means extracts the brightness feature information for each block prepared by segmenting the image to be processed into a plurality of blocks, and numbers of vertical and horizontal segmented blocks are equal to each other regardless of an aspect ratio and a size of the image to be processed.

In a preferred embodiment, the color feature information extraction means extracts the color feature information for each block prepared by segmenting the image to be processed into a plurality of blocks, and numbers of vertical and horizontal segmented blocks are equal to each other regardless of an aspect ratio and a size of the image to be processed.

In a preferred embodiment, the apparatus further comprises storage means for storing an image which is made to correspond to a color information flag representing whether the color information is sufficient, wherein when the reference comparison image is stored in the storage means, the determination means determines whether the color information of the reference comparison image is sufficient, on the basis of the color information flag corresponding to the reference comparison image.

In a preferred embodiment, the apparatus further comprises designation means for designating the reference comparison image from an image stored in the storage means.

According to the present invention, the foregoing object is attained by providing an image processing apparatus which performs an image registration process for an image subjected to similar image retrieval, comprising:

input means for inputting an image;

generation means for generating management information for managing the image;

brightness feature information extraction means for extracting brightness feature information on a brightness of the image;

color feature information extraction means for extracting color feature information on a color of the image; and storage means for storing the image, the management information, the brightness feature information, and the color feature information in correspondence with each other.

In a preferred embodiment, the apparatus further comprises determination means for determining whether color information of the image is sufficient, wherein the storage means stores the image in correspondence with a color information flag representing whether the color information obtained by a determination result of the determination means is sufficient.

According to the present invention, the foregoing object is attained by providing an image processing method of retrieving a similar image on the basis of a similarity between a reference comparison image serving as a retrieval condition and a target comparison image, comprising:

a brightness feature information extraction step of extracting brightness feature information on a brightness of an image to be processed;

a color feature information extraction step of extracting color feature information on a color of the image to be processed;

a determination step of determining whether color information of the image to be processed is sufficient;

a comparison step of, when color information of the reference comparison image is sufficient as a result of determination in the determination step, performing a similarity comparison between color feature information of the reference comparison image and color feature information of the target comparison image, and when the color information of the reference comparison image is insufficient, performing a similarity comparison between brightness feature information of the reference comparison image and brightness feature information of the target comparison image; and an output step of outputting an image serving as a retrieval result on the basis of a comparison result of the comparison step.

According to the present invention, the foregoing object is attained by providing an image processing method of performing an image registration process for an image subjected to similar image retrieval, comprising:

an input step of inputting an image;

a generation step of generating management information for managing the image;

a brightness feature information extraction step of extracting brightness feature information on a brightness of the image;

a color feature information extraction step of extracting color feature information on a color of the image; and a storage step of storing the image, the management information, the brightness feature information, and the color feature information in a storage medium in correspondence with each other.

According to the present invention, the foregoing object is attained by providing a program which realizes an image process of retrieving a similar image on the basis of a similarity between a reference comparison image serving as a retrieval condition and a target comparison image, comprising:

a program code for a brightness feature information extraction step of extracting brightness feature information on a brightness of an image to be processed;

a program code for a color feature information extraction step of extracting color feature information on a color of the image to be processed;

a program code for a determination step of determining whether color information of the image to be processed is sufficient;

a program code for a comparison step of, when color information of the reference comparison image is sufficient as a result of determination in the determination step, performing a similarity comparison between color feature information of the reference comparison image and color feature information of the target comparison image, and when the color information of the reference comparison image is insufficient, performing a similarity comparison between brightness feature information of the reference comparison image and brightness feature information of the target comparison image; and a program code for an output step of outputting an image serving as a retrieval result on the basis of a comparison result of the comparison step.

According to the present invention, the foregoing object is attained by providing a program which realizes an image process of performing an image registration process for an image subjected to similar image retrieval, comprising:

a program code for an input step of inputting an image;

a program code for a generation step of generating management information for managing the image;

a program code for a brightness feature information extraction step of extracting brightness feature information on a brightness of the image;

a program code for a color feature information extraction step of extracting color feature information on a color of the image; and a program code for a storage step of storing the image, the management information, the brightness feature information, and the color feature information in a storage medium in correspondence with each other.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 2 is a table showing an example of the structure of an image management DB according to the first embodiment of the present invention;

FIG. 3 is a table showing an example of the structure of a brightness feature information table according to the first embodiment of the present invention;

FIG. 4 is a table showing an example of the structure of a color feature information table according to the first embodiment of the present invention;

FIG. 8 is a table showing an example of a brightness rank table according to the first embodiment of the present invention;

FIG. 18 is a view showing an example of the structure of a color bin penalty matrix according to the first embodiment of the present invention;

FIG. 22 is a view showing an example of the structure of a brightness rank ID penalty matrix according to the first embodiment of the present invention;

FIG. 28 is a table showing an example of the structure of an image management DB according to the second embodiment of the present invention.

DETAILED DESCRIPTION OF THE PREFERRED EMBODIMENTS

Preferred embodiments of the present invention will be described in detail in accordance with the accompanying drawings.

First Embodiment

Figure 1:
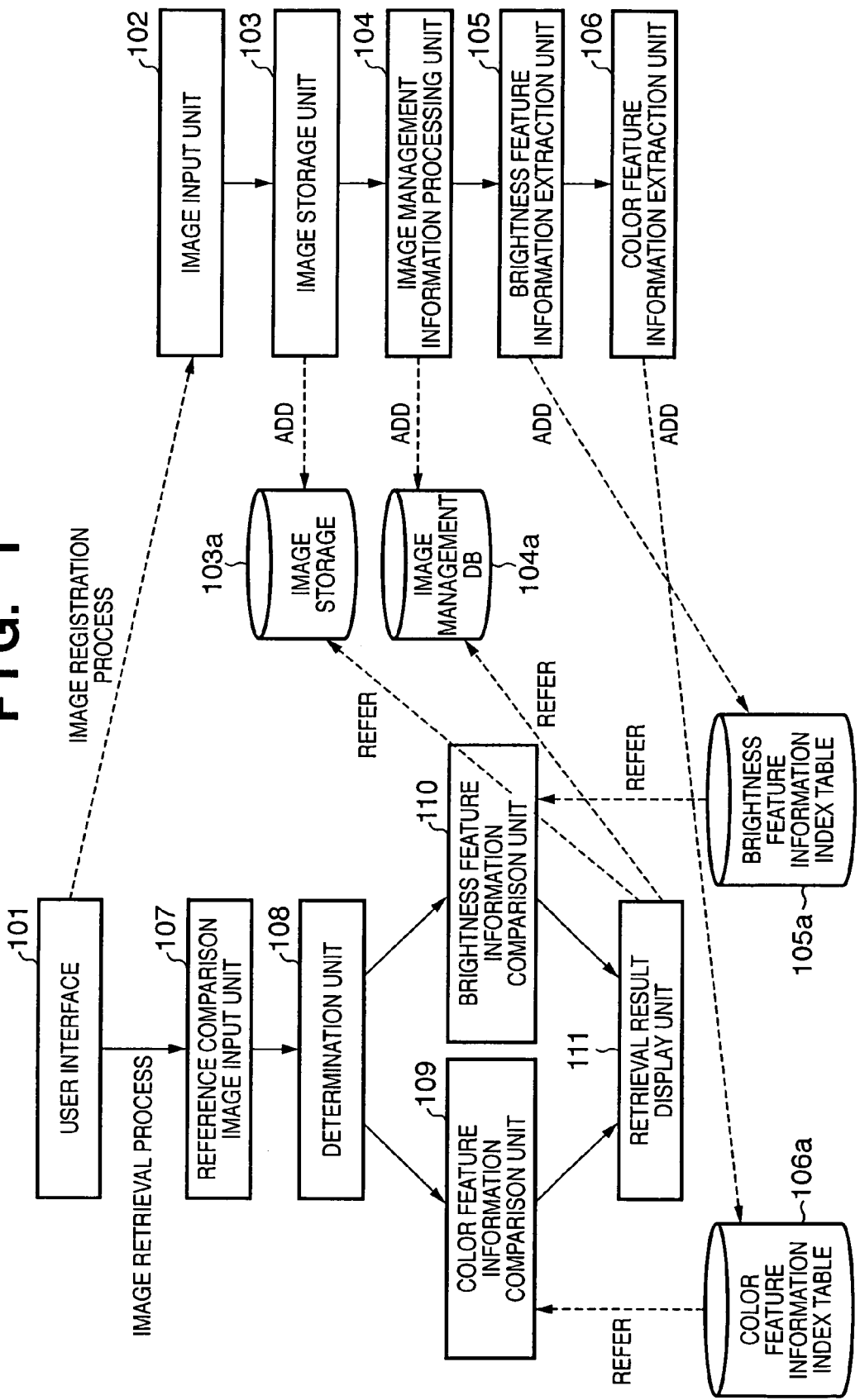
FIG. 1 is a block diagram showing an image processing apparatus according to the first embodiment of the present invention.

FIG. 1 is a block diagram showing an image processing apparatus according to the first embodiment of the present invention.

The present invention will sequentially explain an image registration process of registering an image and an image retrieval process of retrieving a desired image from registered images.

The image registration process is to input an image to be registered, extract the image feature amount of the input image, and store the input image and image feature amount in correspondence with each other.

The image retrieval process is a so-called similar image retrieval process. The image feature amount of a reference comparison image serving as a retrieval condition is extracted (when a registered image is used as a reference comparison image, an image feature amount corresponding to the image is read out). The image feature amount and a registered image feature amount are compared, and an image similar to the reference comparison image is retrieved on the basis of the comparison result.

In extracting an image feature amount in the image registration process, according to the first embodiment, an image to be processed is segmented into a plurality of regions, and the image feature amount is extracted from each region. The numbers of vertical and horizontal blocks in the region are equal to each other regardless of the aspect ratio and size of an image to be processed. Similarly, extraction of an image feature amount in the image retrieval process also adopts the same condition as that of extraction of an image feature amount in the image registration process. The image feature amount includes both color feature information on the color of an image and brightness feature information on the brightness of the image.

In FIG. 1, reference numeral 101 denotes a user interface (UI) for executing various processes including the image registration process and image retrieval process according to the present invention. The user interface is implemented by, e.g., a graphical user interface and input device. The user can properly execute the image registration process and image retrieval process with the UI 101.

Reference numeral 102 denotes an image input unit which inputs an image to be registered by the image registration process. Reference numeral 103 denotes an image storage unit which stores an input image in an image storage 103a. Reference numeral 104 denotes an image management information processing unit which generates management information for managing an input image. Reference numeral 105 denotes a brightness feature information extraction unit which extracts brightness feature information on the brightness of an input image and registers the extracted brightness feature information in a brightness feature information index table 105a. Reference numeral 106 denotes a color feature information extraction unit which extracts color feature information on the color of an input image and registers the extracted color feature information in a color feature information index table 106a.

Reference numeral 107 denotes a reference comparison image input unit which inputs an image serving as a retrieval condition for the image retrieval process (reference comparison image in similar image retrieval). Reference numeral 108 denotes a determination unit which determines whether color information of an input reference comparison image is sufficient. Reference numeral 109 denotes a color feature information comparison unit which performs a similarity comparison between a reference comparison image and a target comparison image on the basis of color feature information. Reference numeral 110 denotes a brightness feature information comparison unit which performs a similarity comparison between a reference comparison image and a target comparison image on the basis of brightness feature information. Reference numeral 111 denotes a retrieval result display unit which displays an image serving as a retrieval result on the basis of the processing result of the color feature information comparison unit 109 or brightness feature information comparison unit 110. The retrieval result display unit 111 may be so configured as to print an image serving as a retrieval result by a printer. Especially when the retrieval result is only one image and this image is to be printed, the processing speed can be increased.

Details of processes executed by various building components which form the image processing apparatus will be sequentially explained.

The image processing apparatus comprises standard building components (e.g., a CPU, memory (RAM and ROM), hard disk, external memory, network interface, display, keyboard, and mouse) for a general-purpose computer.

All or some of various building components shown in FIG. 1 may be implemented by dedicated hardware or software which is executed under the control of the CPU.

A case wherein the image registration process is executed via the UI 101 will be described.

[Image Registration Process]

In the image registration process, an image to be registered is input from the image input unit 102. An image to be registered can be input using an input device such as a scanner or by loading an image stored in an external memory. The input image is temporarily stored in the memory, and whether the type of image is a color, monochrome, or grayscale image can be determined from the data format of the image stored in the memory.

The image storage unit 103 stores, in the image storage 103a, the image in the memory, and stores the image in correspondence with its file name.

The image management information processing unit 104 generates an image ID unique to the image, and stores, in an image management database (DB) 104a, information as management information which makes the image ID, the file name of the image (file name including full path information representing the storage destination (address)), and the image input date correspond to each other.

FIG. 2 shows an example of the structure of the image management DB 104a.

The brightness feature information extraction unit 105 extracts brightness feature information on the brightness of an image, makes the extracted brightness feature information and image ID correspond to each other, and registers them in the brightness feature information index table 105a. The color feature information extraction unit 106 extracts color feature information on the color of the image, makes the extracted color feature information and image ID correspond to each other, and registers them in the color feature information index table 106a.

FIGS. 3 and 4 show examples of the structures of the brightness feature information index table 105a and color feature information index table 106a. These index tables store and manage pairs of various pieces of feature information and image IDs, and can make them correspond to each other by using the records and image IDs of the image management DB 104a.

Even when the type of image to be processed is a monochrome or grayscale image, the color feature information extraction unit 106 extracts color feature information. In particular, when the reference comparison image is a color image, the similar image retrieval process using color feature information is executed. At this time, if the reference comparison image does not have any color information, like a monochrome or grayscale image, color feature information representing this can be very important information.

For example, when the reference comparison image is formed in a light color such as a pastel, high similarly is expected to be calculated between color feature information of the reference comparison image and that of a target comparison image (image to be retrieved) regardless of whether the target comparison image is a monochrome or grayscale image.

Details of processes executed by the brightness feature information extraction unit 105 will be described.

The brightness feature information-extraction unit 105 can appropriately select and execute the following three brightness feature information extraction methods.

<Brightness Feature Information Extraction Method 1>

In method 1, information which makes a brightness rank corresponding to a mode brightness in the brightness histogram of each block prepared by segmenting an image to be processed into a plurality of blocks and position information of the block correspond to each other is extracted as brightness feature information.

Details of this process will be explained with reference to FIG. 5.

Figure 5:
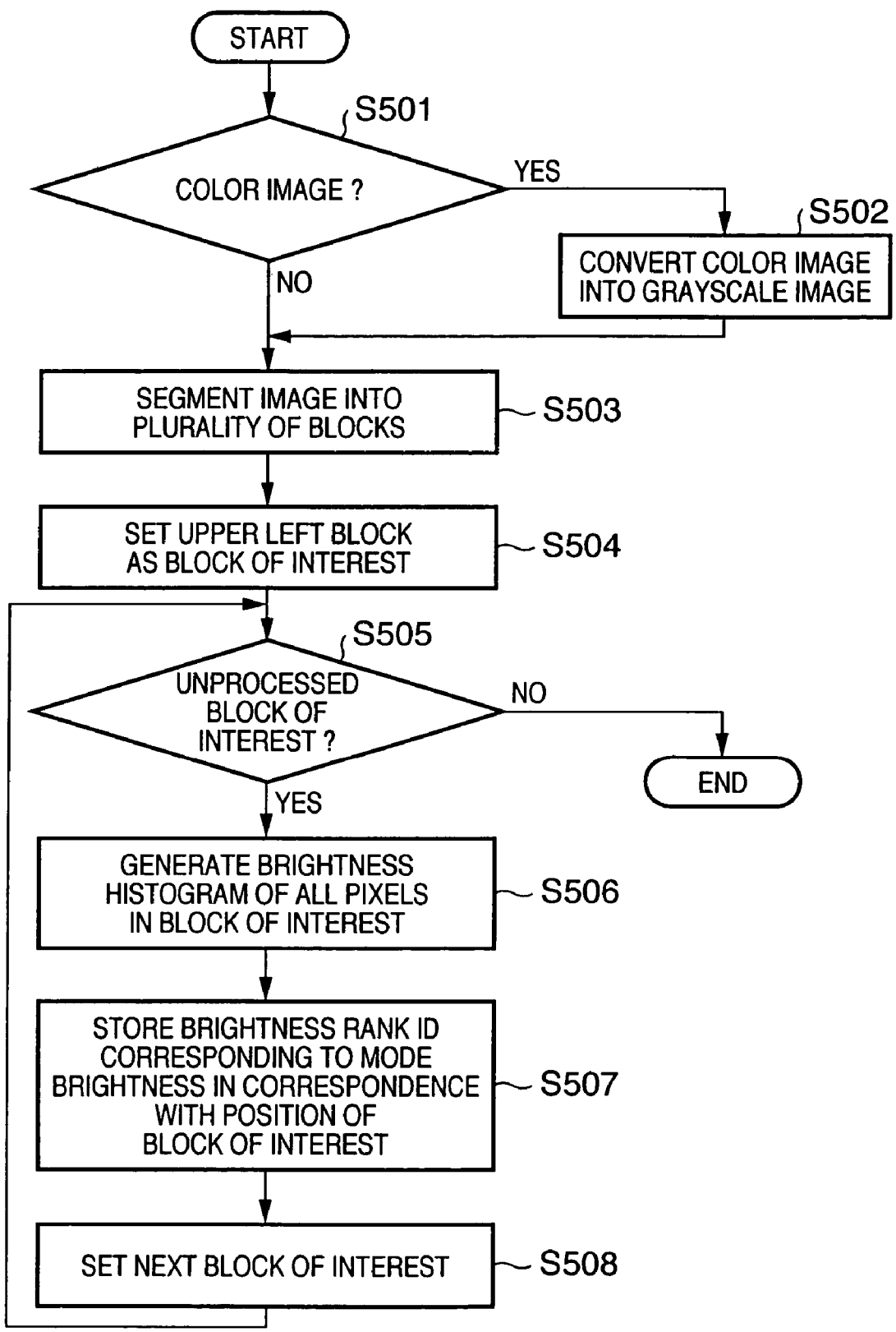
FIG. 5 is a flow chart showing details of the first brightness feature information extraction process according to the first embodiment of the present invention.

FIG. 5 is a flow chart showing details of the first brightness feature information extraction process according to the first embodiment of the present invention.

In step S501, whether an image to be processed is a color image is determined.

This determination is executed on the basis of the data format of an image to be processed.

For example, in a DIB format which is a general-purpose image data format used in the operating system Windows® available from Microsoft, a member biBitCount in a structure BITMAPINFOHEADER in the data header represents the number of bits used to express one pixel in an image.

Particularly, biBitCount=24 represents a full-color image, biBitCount=1 represents a monochrome binary image, and biBitCount=8 represents a 256-color or grayscale image.

When biBitCount is 8, whether the image is a 256-color or grayscale image can be determined by referring to the contents of a member bmicolors in the structure BITMAPINFO in the data header. That is, the contents of the member bmiColors represent a grayscale color palette or a color palette decreased to 256 colors. Whether the image is a 256-color or grayscale image can be determined on the basis of the bmiColors contents.

If the image to be processed is not a color image in step S501 (NO in step S501), the process advances to step S503. If the image is a color image (YES in step S501), the process advances to step S502 to convert the color image into a grayscale image (8 bits: 256 gray levels).

Conversion is executed using a known RGB color matrix. For example, when the YCbCr color space is used, the relationship between the value of the luminance Y representing a grayscale value and R, G, and B values (8 bits each: a total of 24 bits) is given by $$Y=0.29900*R+0.58700*G+0.11400*B \qquad (1)$$

The value of the luminance Y can be calculated from equation (1).

In step S503, the image is segmented into a plurality of blocks.

Figure 6:
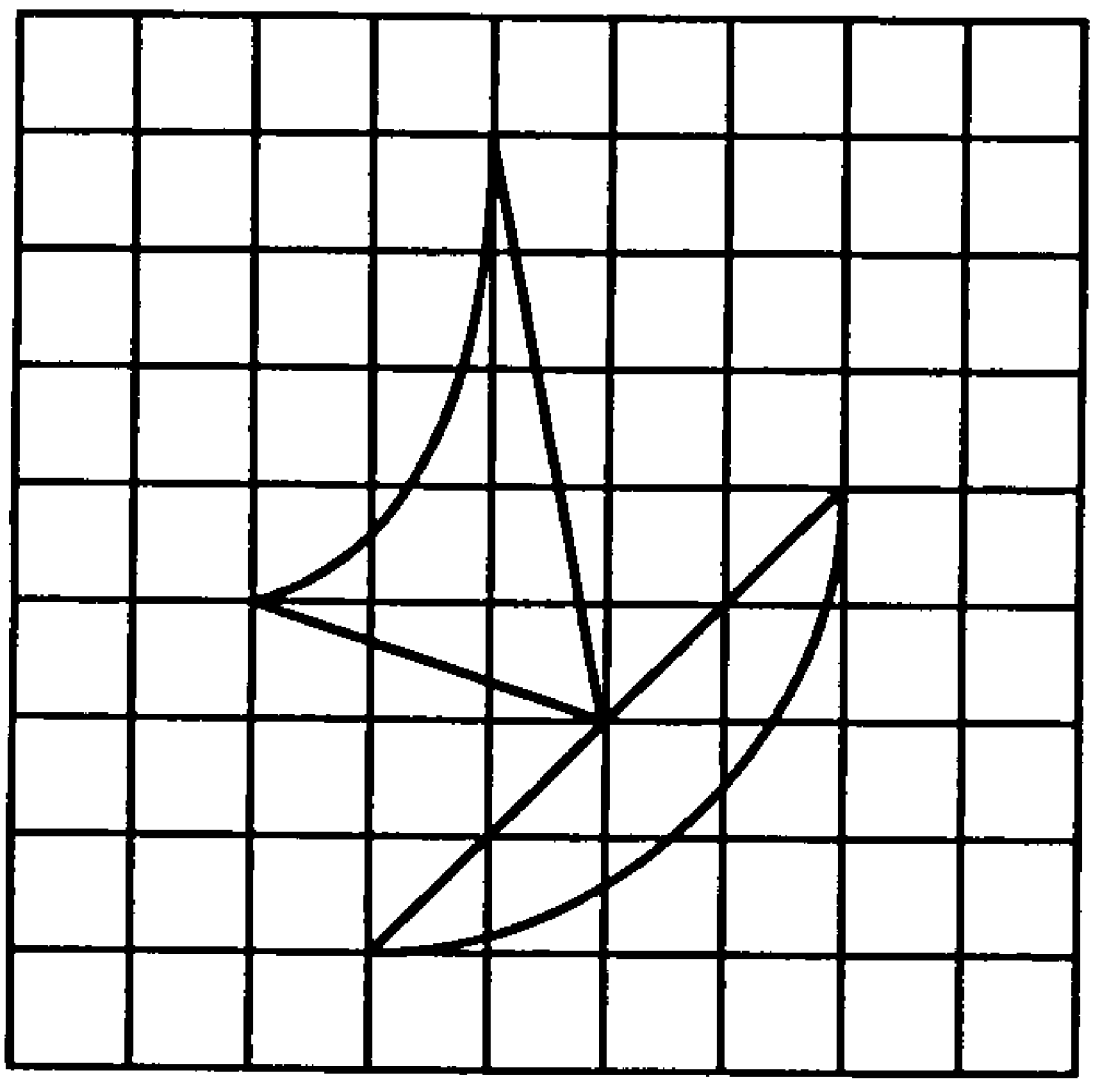
FIG. 6 is a view showing an example of image block segmentation according to the first embodiment of the present invention.

In the first embodiment, as shown in FIG. 6, the image is segmented into nine blocks in the vertical and horizontal directions each. The first embodiment exemplifies segmentation into 9×9=81 blocks for illustrative convenience. In practice, the number of blocks is preferably about 8 to 15.

Figure 7:
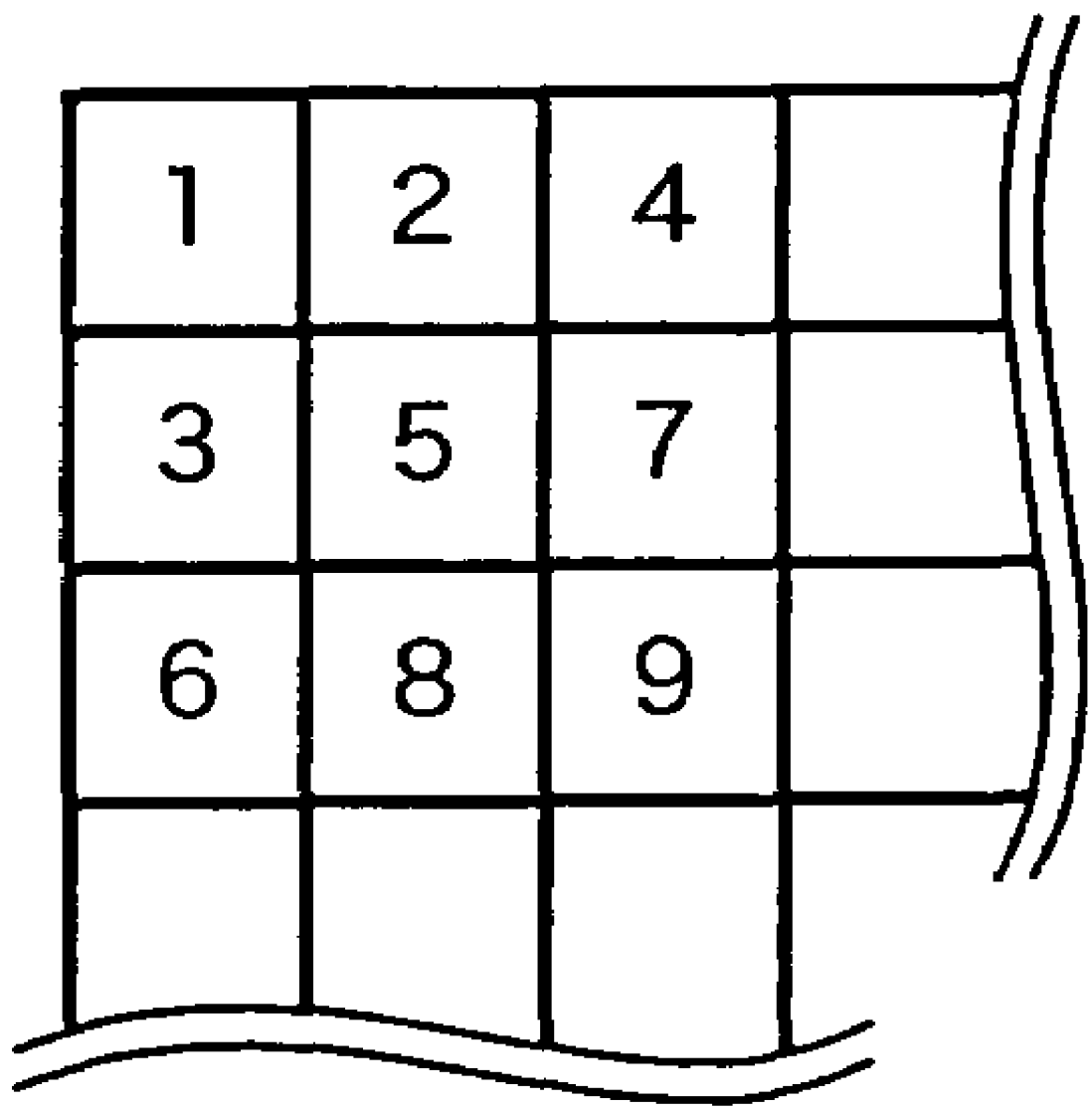
FIG. 7 is a table showing an example of an order decision table according to the first embodiment of the present invention.

In step S504, a block of interest to be processed is set to the upper left block. The block of interest is set by looking up, e.g., an order decision table which decides a processing order in advance, as shown in FIG. 7.

In step S505, whether an unprocessed block of interest exists is determined. If no unprocessed block of interest exists (NO in step S505), the process ends. If an unprocessed block of interest exists (YES in step S505), the process advances to step S506.

In step S506, the brightness histogram of all pixels in the block of interest is generated. In step S507, a brightness rank ID within the mode brightness range of the brightness histogram is determined as the representative brightness of the block of interest by looking up a brightness rank table in FIG. 8. The determined brightness rank ID is stored in the brightness feature information index table 105a in correspondence with the block of interest and its position. In other words, this process is to rank (or quantize) the brightness histogram and determine as a representative brightness a brightness rank having a mode brightness from the ranked histogram.

In the brightness rank table in FIG. 8, a rank is set for an 8-bit brightness signal in each predetermined brightness range.

In step S508, the next block of interest to be processed is set by looking up the order decision table in FIG. 7. After that, the flow returns to step S505 to recursively repeat the processes in steps S505 to S508 until no unprocessed block of interest exists.

By the above process, information which makes the representative brightness of each block of an image to be processed and position information of the block correspond to each other can be extracted as brightness feature information.

<Brightness Feature Information Extraction Method 2>

In method 2, information which makes the average brightness of pixels in each block prepared by segmenting an image to be processed into a plurality of blocks and position information of the block correspond to each other is extracted as brightness feature information.

Details of this process will be explained with reference to FIG. 9.

Figure 9:
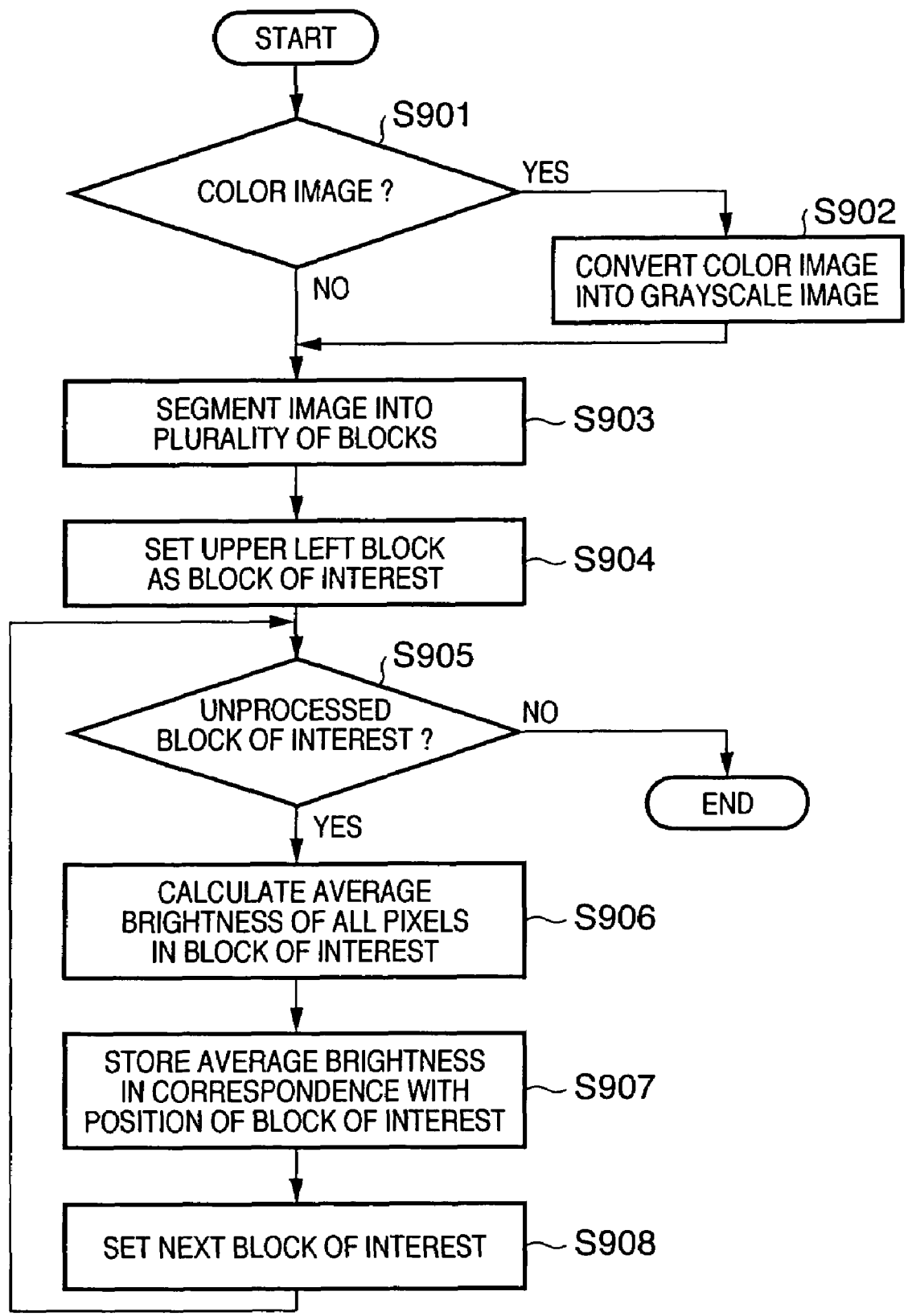
FIG. 9 is a flow chart showing details of the second brightness feature information extraction process according to the first embodiment of the present invention.

FIG. 9 is a flow chart showing details of the second brightness feature information extraction process according to the first embodiment of the present invention.

Steps S901 to S905 and S908 in FIG. 9 correspond to steps S501 to S505 and S508 in FIG. 5, and a detailed description thereof will be omitted.

In step S906 of FIG. 9, the average brightness of the brightnesses of all pixels in a block of interest is calculated. In step S907, the calculated average brightness is stored in the brightness feature information index table 105a in correspondence with the block of interest and its position.

By the above process, information which makes the average brightness of each block of an image to be processed and position information of the block correspond to each other can be extracted as brightness feature information.

<Brightness Feature Information Extraction Method 3>

In method 3, the average brightness (brightness feature information) of pixels in each block prepared by segmenting an image to be processed into a plurality of blocks is calculated. Information which makes a brightness rank in FIG. 8 corresponding to the average brightness and position information of the block correspond to each other is extracted as brightness feature information.

Details of this process will be explained with reference to FIG. 10.

Figure 10:
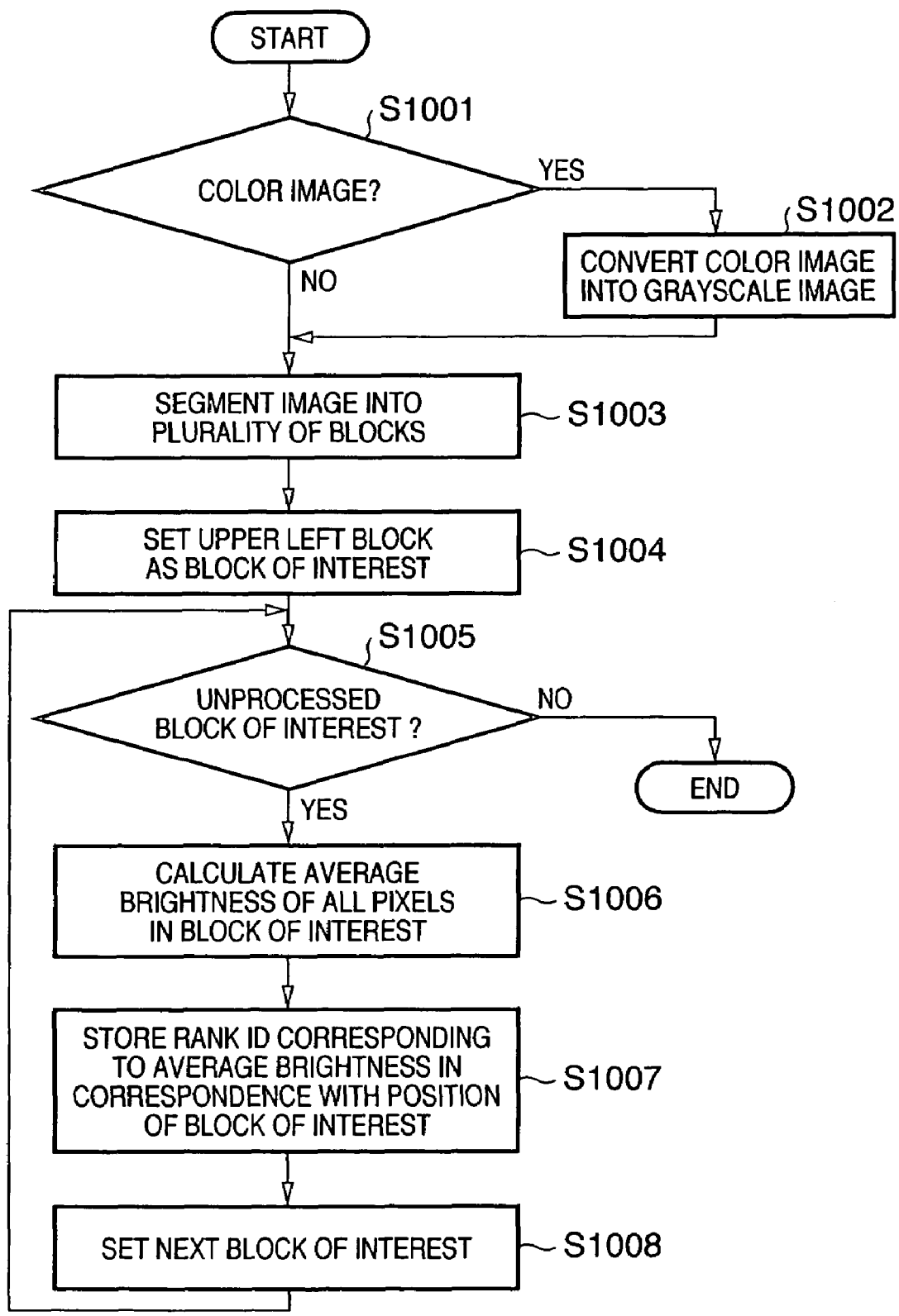
FIG. 10 is a flow chart showing details of the third brightness feature information extraction process according to the first embodiment of the present invention.

FIG. 10 is a flow chart showing details of the third brightness feature information extraction process according to the first embodiment of the present invention.

Steps S1001 to S1005 and S1008 in FIG. 10 correspond to steps S501 to S505 and S508 in FIG. 5, and a detailed description thereof will be omitted.

In step S1006 of FIG. 10, the average brightness of the brightnesses of all pixels in a block of interest is calculated. In step S1007, a brightness rank ID corresponding to the average brightness is determined as the representative brightness of the block of interest by looking up the brightness rank table in FIG. 8. The representative brightness is stored in the brightness feature information index table 105a in correspondence with the block of interest and its position.

By the above process, information which makes a representative brightness corresponding to the average brightness of each block of an image to be processed and position information of the block correspond to each other can be extracted as brightness feature information.

Details of processes executed by the color feature information extraction unit 106 will be described.

The color feature information extraction unit 106 appropriately executes the following three color feature information extraction methods.

Figure 11:
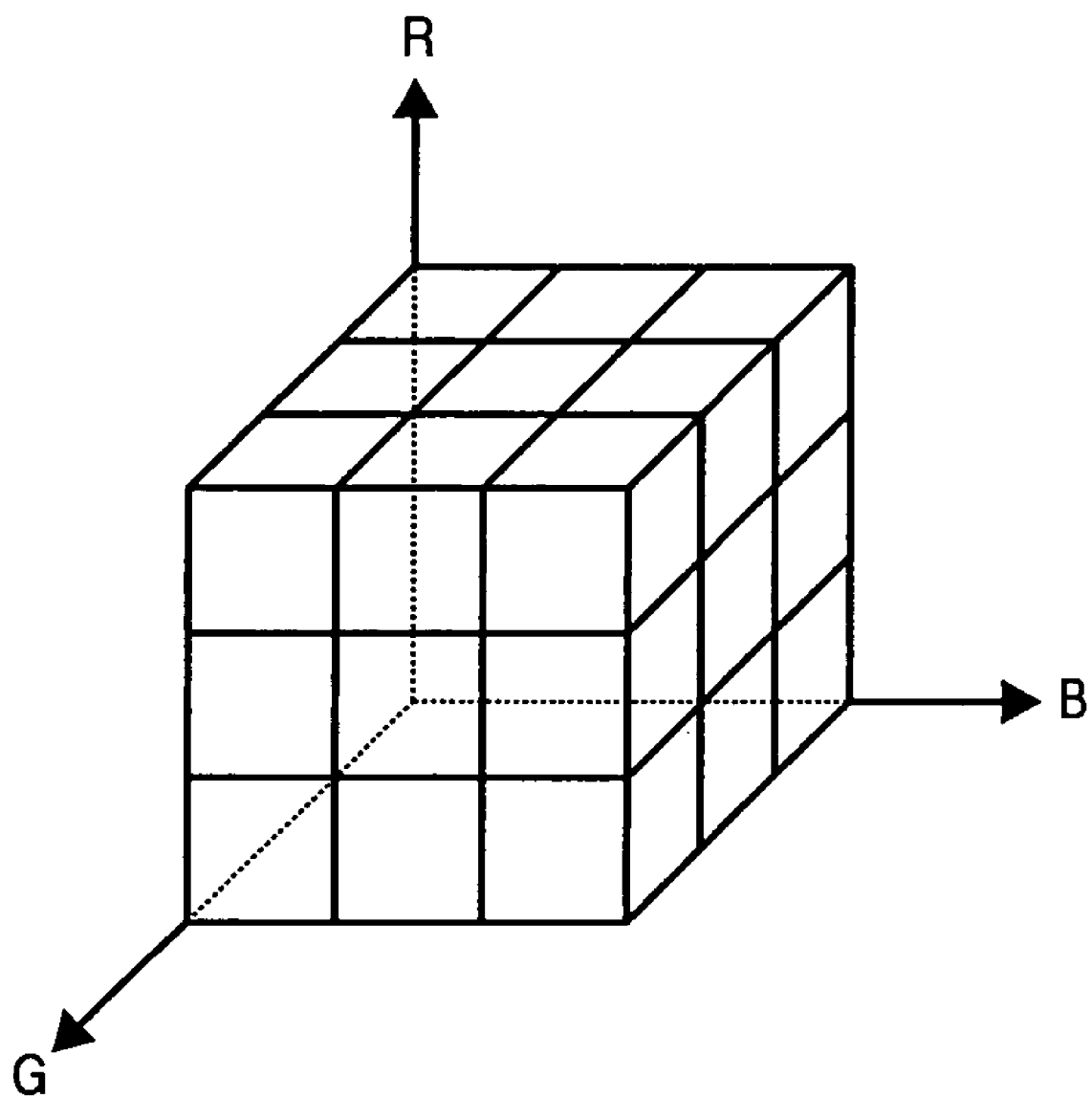
FIG. 11 is a view showing an example of the arrangement of color bins in the color space according to the first embodiment of the present invention.

Note that color feature information extraction can be intuitively considered as three-dimensional expansion of the above-described brightness feature information extraction. In brightness feature information extraction, the representative brightness is of each block of interest is determined using the one-dimensional brightness rank table in FIG. 8. In color feature information extraction, the RGB color space as shown in FIG. 11 is three-dimensionally divided into a plurality of subspaces (so-called color bins), and color feature information is extracted for each color bin.

<Color Feature Information Extraction Method 1>

In method 1, information which makes a color having a mode color in the color histogram of each block prepared by segmenting an image to be processed into a plurality of blocks and position information of the block correspond to each other is extracted as color feature information.

Details of this process will be explained with reference to FIG. 12.

Figure 12:
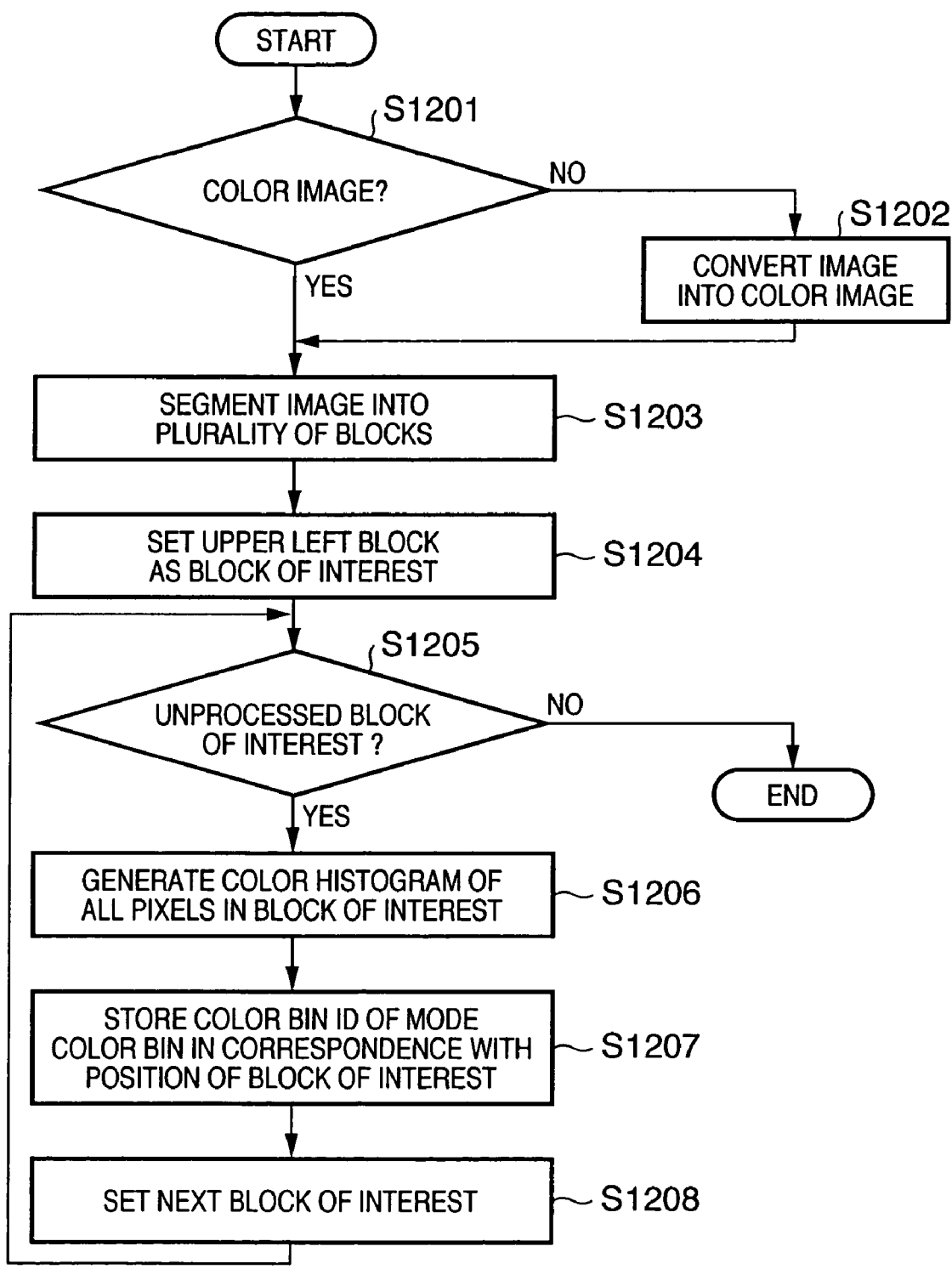
FIG. 12 is a flow chart showing details of the first color feature information extraction process according to the first embodiment of the present invention.

FIG. 12 is a flow chart showing details of the first color feature information extraction process according to the first embodiment of the present invention.

In step S1201, whether an image to be processed is a color image is determined. This determination is performed similarly to step S501 in FIG. 5.

If the image to be processed is a color image in step S1201 (YES in step S1201), the process advances to step S1203. If the image is not a color image (NO in step S1201), the process advances to step S1202 to convert the grayscale image into a color image.

In conversion, a pixel having a brightness value a is given R, G, and B values (a, a, a), and data are arranged in consideration of the padding of the DIB format. The padding is an image data expression specification used to store color image data in a Windows® DIB format (as a file, a bitmap file (*.BMP)).

In step S1203, the image is segmented into a plurality of blocks. In the first embodiment, as shown in FIG. 6, the image is segmented into nine blocks in the vertical and horizontal directions each. The first embodiment exemplifies segmentation into 9×9=81 blocks for illustrative convenience. In practice, the number of blocks is preferably about 15×15=225.

In step S1204, a block of interest to be processed is set to the upper left block. The block of interest is set similarly to step S504 in FIG. 5.

In step S1205, whether an unprocessed block of interest exists is determined. If no unprocessed block of interest exists (NO in step S1205), the process ends. If an unprocessed block of interest exists (YES in step S1205), the process advances to step S1206.

In step S1206, the density values of all pixels in a block of interest are projected into color bins serving as subspaces prepared by dividing the color space in FIG. 11, and the color histogram of the color bins is generated.

In the first embodiment, the density values of all pixels in a block of interest are projected into color bins serving as subspaces prepared by dividing the RGB color space into 3×3×3=27, as shown in FIG. 11. In practice, the density values of all pixels in a block of interest are more preferably projected into color bins obtained by dividing the RGB color space into 6×6×6=216.

In step S1207, the color bin ID of the mode color bin of the color histogram is determined as the representative color of the block of interest. The determined color bin ID is stored in the color feature information index table 106a in correspondence with the block of interest and its position.

In step S1208, the next block of interest to be processed is set by looking up the order decision table in FIG. 7. The flow then returns to step S1205 to recursively repeat processes in steps S1205 to S1208 until no unprocessed block of interest exists.

By the above process, information which makes the representative color of each block of an image to be processed and position information of the block correspond to each other can be extracted as color feature information.

<Color Feature Information Extraction Method 2>

In method 2, information which makes the average color of pixels in each block prepared by segmenting an image to be processed into a plurality of blocks and position information of the block correspond to each other is extracted as color feature information.

Details of this process will be explained with reference to FIG. 13.

Figure 13:
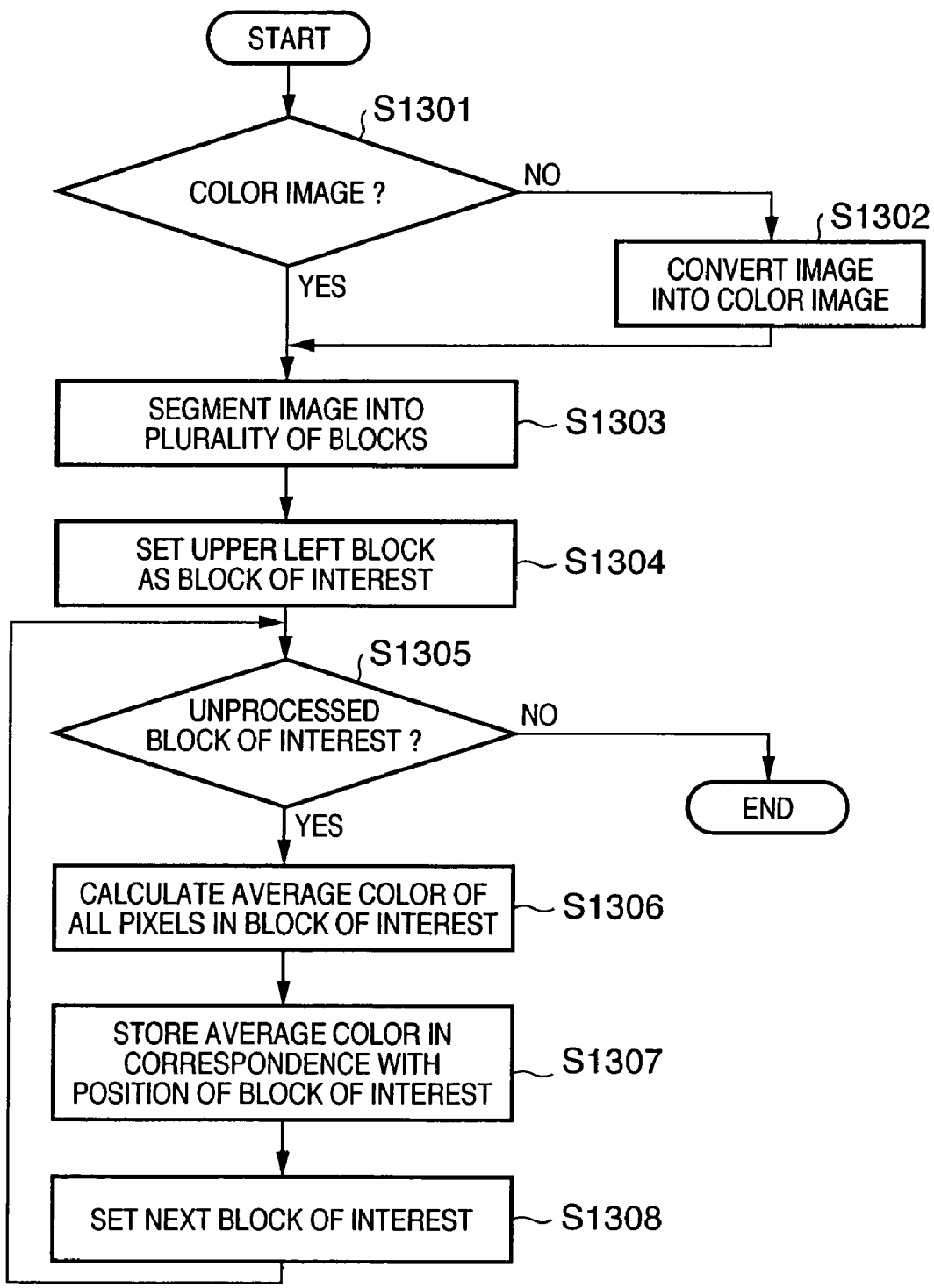
FIG. 13 is a flow chart showing details of the second color feature information extraction process according to the first embodiment of the present invention.

FIG. 13 is a flow chart showing details of the second color feature information extraction process according to the first embodiment of the present invention.

Steps S1301 to S1305 and S1308 in FIG. 13 correspond to steps S1201 to S1205 and S1208 in FIG. 12, and a detailed description thereof will be omitted.

In step S1306 of FIG. 13, the average color of the colors of all pixels in a block of interest is calculated. In step S1307, the calculated average color is stored in the color feature information index table 106a in correspondence with the block of interest and its position.

By the above process, information which makes the average color of each block of an image to be processed and position information of the block correspond to each other can be extracted as color feature information.

<Color Feature Information Extraction Method 3>

In method 3, the average color of pixels in each block prepared by segmenting an image to be processed into a plurality of blocks is calculated. Information which makes a color bin ID corresponding to the average color and position information of the block correspond to each other is extracted as color feature information.

Details of this process will be explained with reference to FIG. 14.

Figure 14:
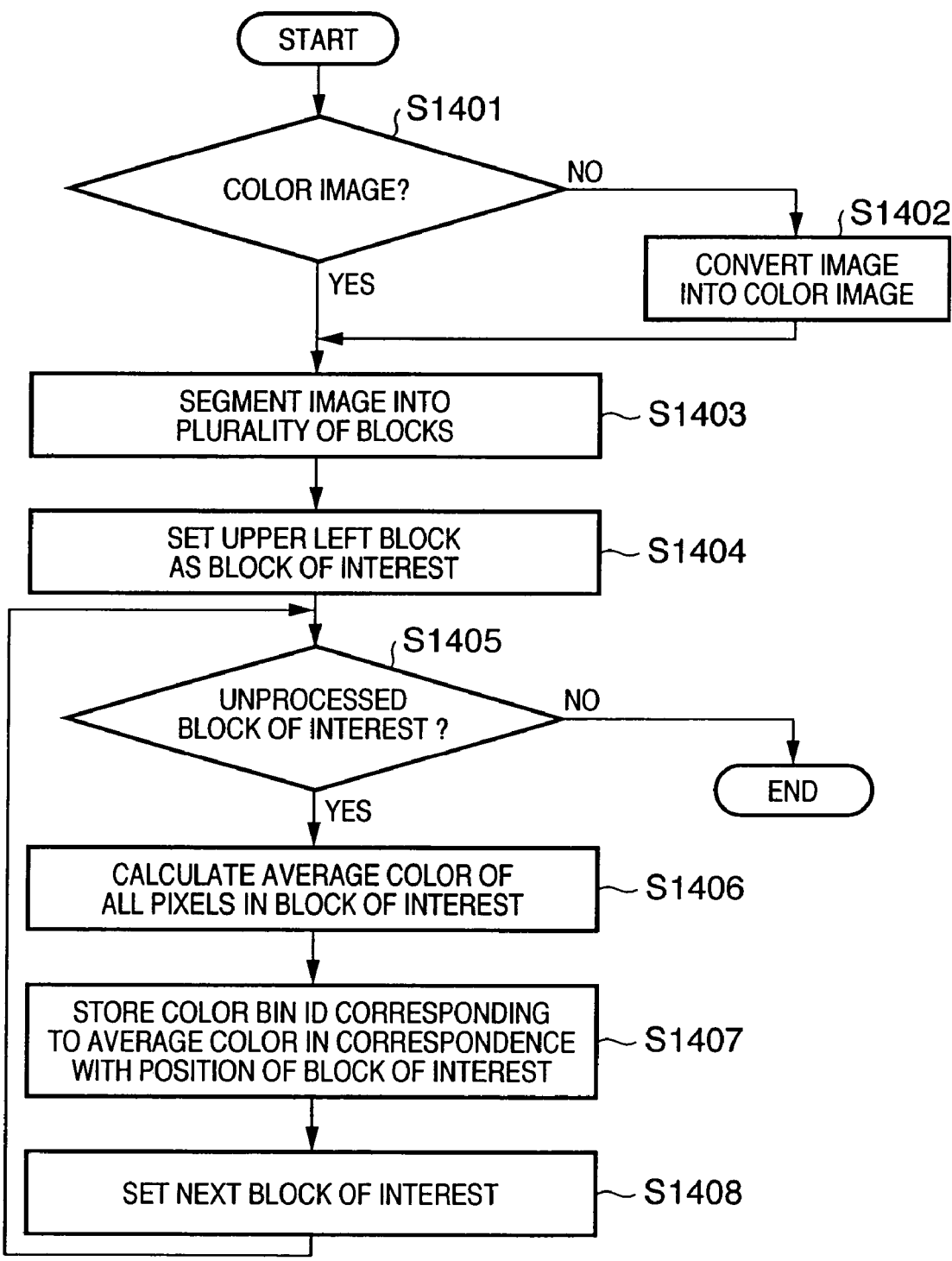
FIG. 14 is a flow chart showing details of the third color feature information extraction process according to the first embodiment of the present invention.

FIG. 14 is a flow chart showing details of the third color feature information extraction process according to the first embodiment of the present invention.

Steps S1401 to S1405 and S1408 in FIG. 14 correspond to steps S1201 to S1205 and S1208 in FIG. 12, and a detailed description thereof will be omitted.

In step S1406 of FIG. 14, the average color of the colors of all pixels in a block of interest is calculated. In step S1407, a color bin ID corresponding to the average color is determined as the representative color of the block of interest. The representative color is stored in the color feature information index table 106a in correspondence with the block of interest and its position.

By the above process, information which makes a representative color bin ID corresponding to the average color of each block of an image to be processed and position information of the block correspond to each other can be extracted as color feature information.

As described above, the first embodiment employs the three brightness feature information extraction methods and the three color feature information extraction methods. When these methods are to be utilized in the image registration process, they are not arbitrarily combined and executed.

In the above example, as for combinations of brightness feature information extraction methods 1 and 3 using the rank/quantization concept and color feature information extraction methods 1 and 3 using the rank concept, when the number of ranks or quantization steps for a representative brightness serving as brightness feature information is smaller than the number of bins in the grayscale direction of a color bin which describes color feature information, it is difficult to realize retrieval which compensates for the disadvantages of brightness information retrieval and color information retrieval and exploits their advantages.

However, this does not apply to a case wherein the use of nonuniform ranking or nonlinear quantization provides high effective efficiency in comparison with an actual number of ranks or quantization steps.

The image retrieval process via the UI 101 will be described.

[Image Retrieval Process]

In the image retrieval process, a reference comparison image serving as a retrieval condition is input from the reference comparison image input unit 107. A reference comparison image can be input using an input device such as a scanner or by loading an image stored in an external memory. The input image is temporarily stored in the memory, and whether the type of image is a color image or a monochrome or grayscale image can be determined from the data format of the image stored in the memory.

In the image retrieval process according to the first embodiment, attention is given to only whether color information of a reference comparison image is sufficient. When color information of the reference comparison image is sufficient, a similarity comparison between color feature information of the reference comparison image and that of a target comparison image is performed. If color information of the reference comparison image is insufficient, a similarity comparison between brightness feature information of the reference comparison image and that of a target comparison image is done. This similar image retrieval will be exemplified.

In this process, the determination unit 108 determines whether color information of an image in the memory is sufficient.

If the color information is sufficient, the color feature information comparison unit 109 compares color feature information of a reference comparison image with that of an image to be retrieved that is stored in the image storage 103a, thereby retrieving a similar image.

When the color information is insufficient, the brightness feature information comparison unit 110 compares brightness feature information of a reference comparison image with that of an image to be retrieved that is stored in the image storage 103a, thereby retrieving a similar image.

A similarity comparison process can be therefore achieved by a method suitable for the type of reference comparison image (monochrome or grayscale image or color image).

In determination by the determination unit 108, the data format of a reference comparison image is analyzed by, as the simplest method, the same method as that described above in the image registration process. When the reference comparison image is a monochrome or grayscale image, the image does not have any color information, and color information of the reference comparison image is determined to be insufficient.

When the reference comparison image is a color image, its color information is determined to be sufficient. In some cases, however, the data format corresponds to a color image, but the content is a grayscale image. In this case, even when the data format corresponds to a color image, whether color information of a reference comparison image is sufficient must be strictly determined. The determination method utilizes analysis of the color of a reference comparison image.

The gist of the analysis is to analyze the ratio of color information which occupies a reference comparison image. When the ratio of color information to the reference comparison image is equal to or higher than a predetermined threshold, the color information is determined to be sufficient. When the ratio is lower than the threshold, the color information is determined to be insufficient.

The determination unit 108 has two analysis methods of analyzing the ratio of color information which occupies a reference comparison image.

<Color Analysis Method 1>

Figure 15:
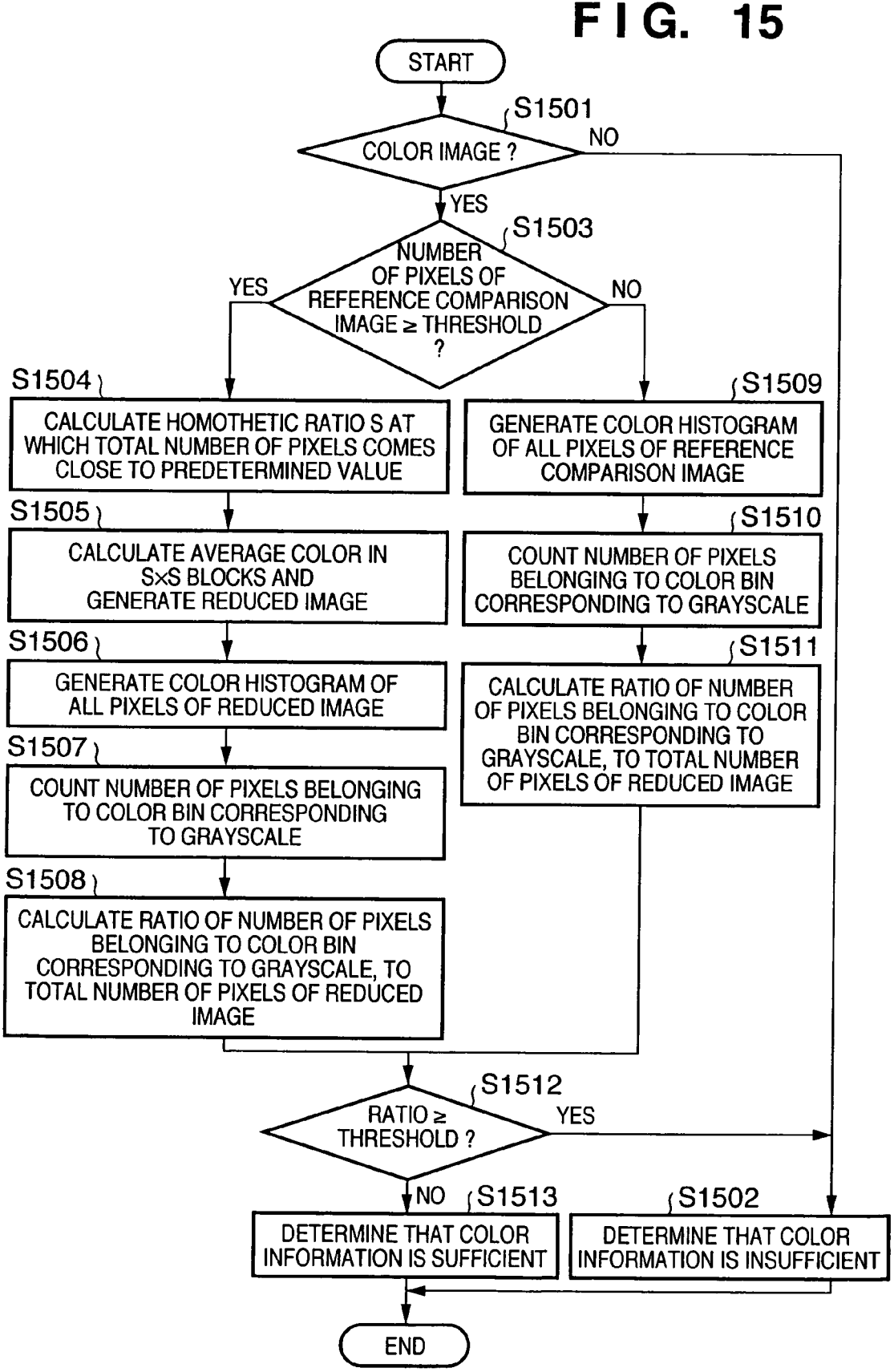
FIG. 15 is a flow chart showing the first color analysis method according to the first embodiment of the present invention.

FIG. 15 is a flow chart showing the first color analysis method according to the first embodiment of the present invention.

In step S1501, whether the reference comparison image is a color image is determined. If the reference comparison image is not a color image (NO in step S1501), the process advances to step S1502 to determine that color information of the reference comparison image is insufficient. If the reference comparison image is a color image (YES in step S1501), the process advances to step S1503.

In step S1503, whether the number of pixels of the reference comparison image is equal to or larger than a threshold is determined. If the number of pixels is smaller than the threshold (NO in step S1503), the process advances to step S1509. If the number of pixels is equal to or larger than the threshold (YES in step S1503), the process advances to step S1504.

In step S1504, the homothetic ratio (reduction ratio) at which the total number of pixels decreases to a predetermined smaller value is calculated.

For example, letting Gp be the number of target pixels, H be the height of a reference comparison image, and W be its width, homothetic ratio $S=\text{Int}(\text{sqrt}(H*W/Gp))$ where the function Int(x) means a function which selects an integer value larger than x.

The reduced image of the reference comparison image therefore has a height H2=H/S [pixels] and a width W2=W/S [pixels].

In step S1505, the average color of a block to be processed out of vertical S×horizontal S blocks at the pixel size of the reference comparison image is calculated. The average color is defined as the pixel value of a corresponding pixel in the reduced image. The block to be processed shifts among the S×S blocks in the vertical and horizontal blocks so as not to repetitively choose the same block. The process is repeated to generate the reduced image of the reference comparison image.

The reduced image of the reference comparison image is generated in step S1505 because, if the number of pixels of an image to be processed is very large in generating the color histogram of the reference comparison image in the following step S1506, the load of a process of generating a color histogram becomes large, and the number of pixels of the reference comparison image is decreased to a desired number so as to reduce the processing load. When the number of pixels of an image to be processed is small, the color histogram may be directly generated.

In step S1506, the density values of all pixels which form the reduced image are projected into color bins serving as subspaces prepared by dividing the color space in FIG. 11, and the color histogram of the color bins is generated.

In step S1507, the number of pixels belonging to each color bin in the grayscale direction is counted from histogram information of the color bin. In step S1508, the ratio of the number of pixels belonging to the color bin in the grayscale direction to the total number of pixels of the reduced image is calculated.

In step S1512, whether the calculated ratio is equal to or higher than a predetermined threshold is determined. If the ratio is equal to or higher than the threshold (YES in step S1512), the process advances to step S1502. If the ratio is lower than the threshold (NO in step S1512), the process advances to step S1513 to determine that color information of the reference comparison image is sufficient.

If the number of pixels of the reference comparison image is smaller than the threshold in step S1503, the density values of all pixels which form the reduced image are projected into color bins serving as subspaces prepared by dividing the color space in FIG. 11, and the color histogram of the color bins is generated. In step S1510, the number of pixels belonging to each color bin in the grayscale direction is counted from histogram information of the color bin. In step S1511, the ratio of the number of pixels belonging to the color bin in the grayscale direction to the total number of pixels of the reduced image is calculated. Thereafter, the process advances to step S1512.

<Color Analysis Method 2>

Figure 16:
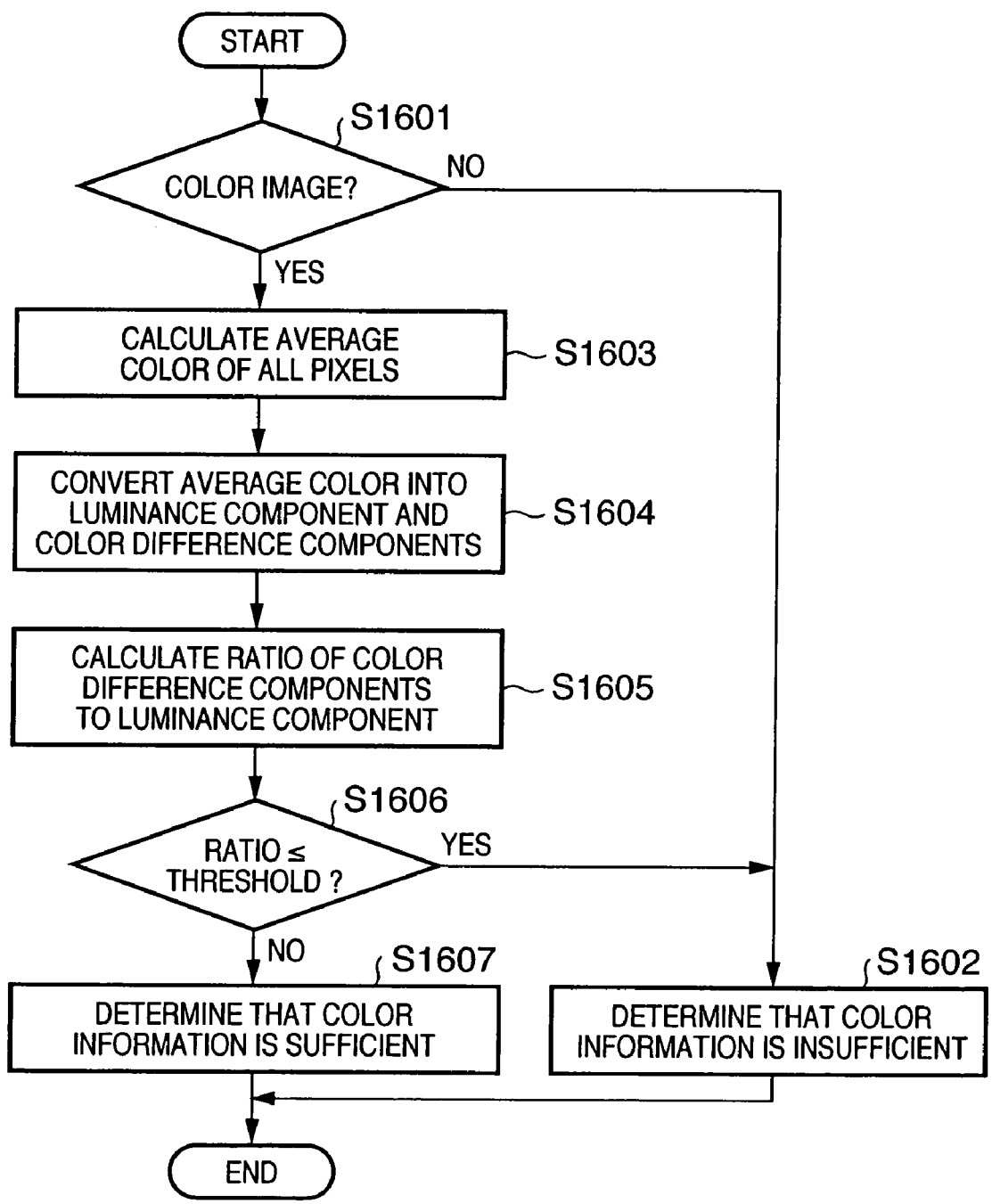
FIG. 16 is a flow chart showing the second color analysis method according to the first embodiment of the present invention.

FIG. 16 is a flow chart showing the second color analysis method according to the first embodiment of the present invention.

In step S1601, whether the reference comparison image is a color image is determined. If the reference comparison image is not a color image (NO in step S1601), the process advances to step S1602 to determine that color information of the reference comparison image is insufficient. If the reference comparison image is a color image (YES in step S1601), the process advances to step S1603.

In step S1603, the average color of the colors of all pixels which form the reference comparison image is calculated. In step S1604, the average color is converted into a luminance component and color difference components. In step S1605, a ratio R of the color difference component values to the luminance component value is calculated.

A separation method of separating the color into a luminance component and color difference components is a known method.

For example, when the YCbCr color space is adopted, relations with 24-bit R, G, and B values are given by $$Y=0.29900*R+0.58700*G+0.11400*B$$

$$Cb=-0.16874*R-0.33126*G+0.50000*B+128$$

$$Cr=0.50000*R-0.41869*G+(-0.08131)*B+128 \quad (2)$$

The calculated average color is separated into a luminance component Yave and color difference components Cbave and Crave in accordance with the equations (2) to calculate $$\text{Ratio } R=\text{sqrt}(Cbave*Cbave+Crave*Crave)/Yave \quad (3)$$

In step S1606, whether the ratio R is equal to or lower than a predetermined threshold is determined. If the ratio R is equal to or lower than the threshold (YES in step S1606), the process advances to step S1602. If the ratio R is higher than the threshold (NO in step S1606), the process advances to step S1607 to determine that color information of the reference comparison image is sufficient.

Details of processes executed by the color feature information comparison unit 109 will be explained.

The color feature information comparison unit 109 can appropriately select and execute the following three color feature information comparison methods.

The color feature information comparison unit 109 employs any one of the above-described color feature information extraction methods 1 to 3 in order to extract color feature information of a reference comparison image.

Color feature information comparison method 1 using color feature extraction method 1 will be explained.

<Color Feature Information Comparison Method 1>

Figure 17:
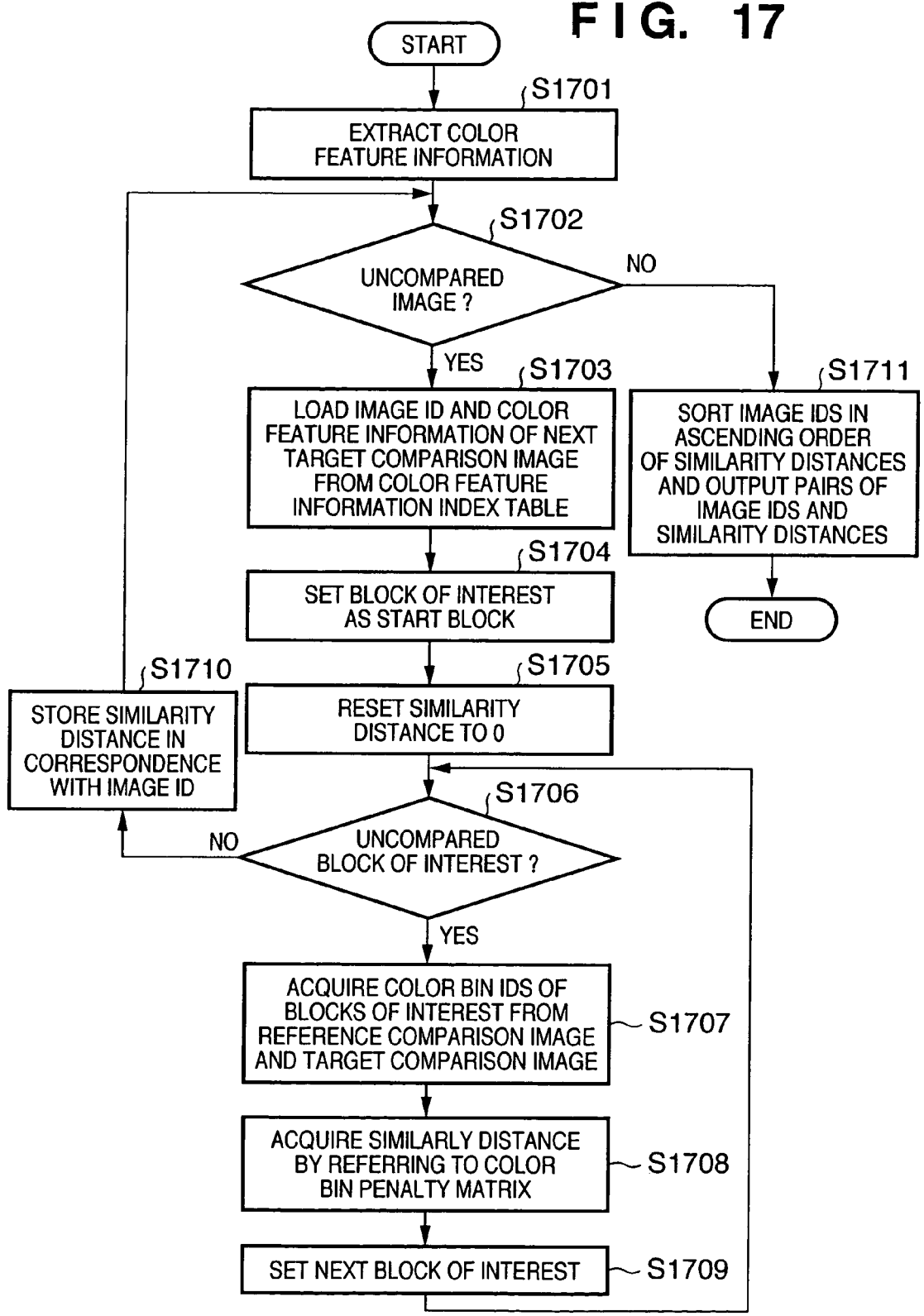
FIG. 17 is a flow chart showing details of the first color feature information comparison process according to the first embodiment of the present invention.

FIG. 17 is a flow chart showing details of the first color feature information comparison process according to the first embodiment of the present invention.

In step S1701, color feature information of a reference comparison image is extracted for each block by the process described in the flow chart of FIG. 12. When the reference comparison image is an image which has already been stored in the image storage 103a, corresponding color feature information is read out from the color feature index table 106a.

In step S1702, whether a target comparison image (stored in the image storage 103a) which has not been compared with the reference comparison image exists is determined. If no uncompared image exists (NO in step S1702), the process advances to step S1711. If an uncompared target comparison image exists (YES in step S1702), the process advances to step S1703.

In step S1703, the image ID of an image to be processed and color feature information of each block are read out by looking up the color feature information index table 106a. In step S1704, a block of interest in the image to be processed is set as the start block. In step S1705, the similarity distance representing the similarity between color feature information of the reference comparison image and that of the target comparison image is reset to 0.

In step S1706, whether an uncompared block of interest exists is determined. If no uncompared block of interest exists (NO in step S1706), the process advances to step S1710. If an uncompared block of interest exists (YES in step S1706), the process advances to step S1707.

In step S1707, the color bin IDs of blocks of interest are acquired from color feature information of the reference comparison image and that of the target comparison image.

Figure 18:
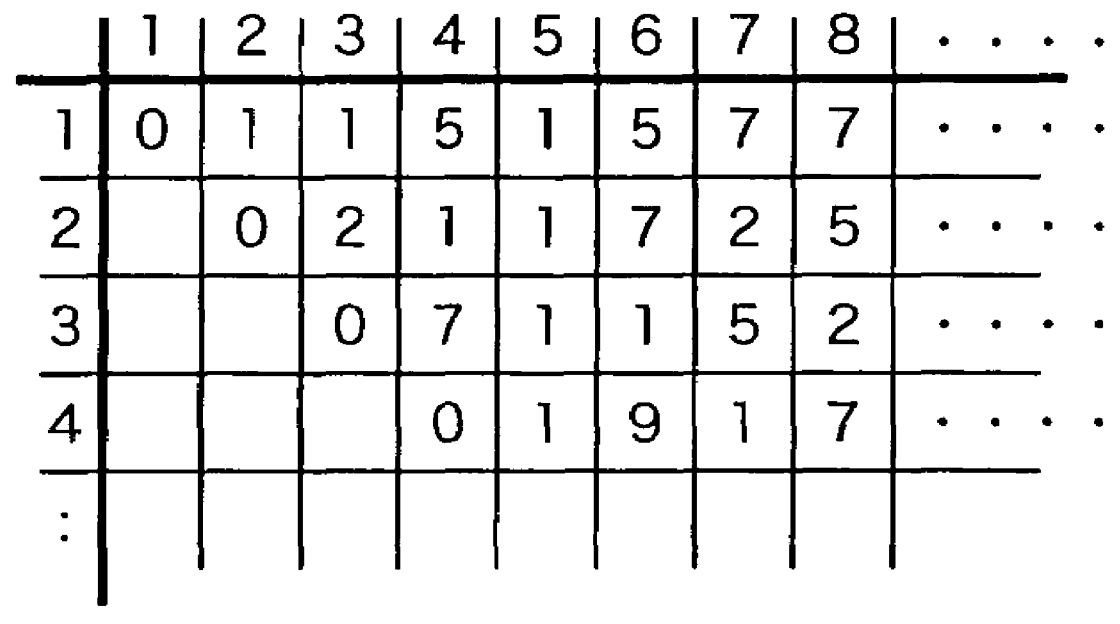

In step S1708, the local similarity distance of the block of interest that corresponds to the interval between the acquired color bin IDs is acquired by referring to a color bin penalty matrix in FIG. 18. The local similarity distance is added to the similarity distance acquired in the immediately preceding process. The similarity distance is stored in the memory.

The color bin penalty matrix will be explained with reference to FIG. 18.

FIG. 18 is a view showing the structure of the color bin penalty matrix according to the first embodiment of the present invention.

The color bin penalty matrix manages the local similarity distance between color bin IDs. In FIG. 18, the color bin penalty matrix is configured such that the similarity distance is 0 for the same color bin ID, and as the difference between color bin IDs increases, i.e., the similarity decreases, the similarity distance increases. Diagonal positions for the same color bin ID have a similarity distance of 0, and color bin IDs are symmetrical about the similarity distance of 0.

In the first embodiment, the similarity distance between color bin IDs can be acquired only by referring to the color bin penalty matrix, attaining high processing speed.

In step S1709, the next block of interest to be processed is set.

If no uncompared block of interest exists in step S1706 (NO in step S1706), the process advances to step S1710 to store the similarity distance stored in the memory in correspondence with the image ID.

If no uncompared image exists in step S1702 (NO in step S1702), the process advances to step S1711. Image IDs are sorted in the ascending order of similarity distances corresponding to image IDs stored in the memory, and pairs of sorted image IDs and similarity distances are output as retrieval results.

Color feature information comparison method 2 using color feature extraction method 2 will be explained.

<Color Feature Information Comparison Method 2>

Figure 19:
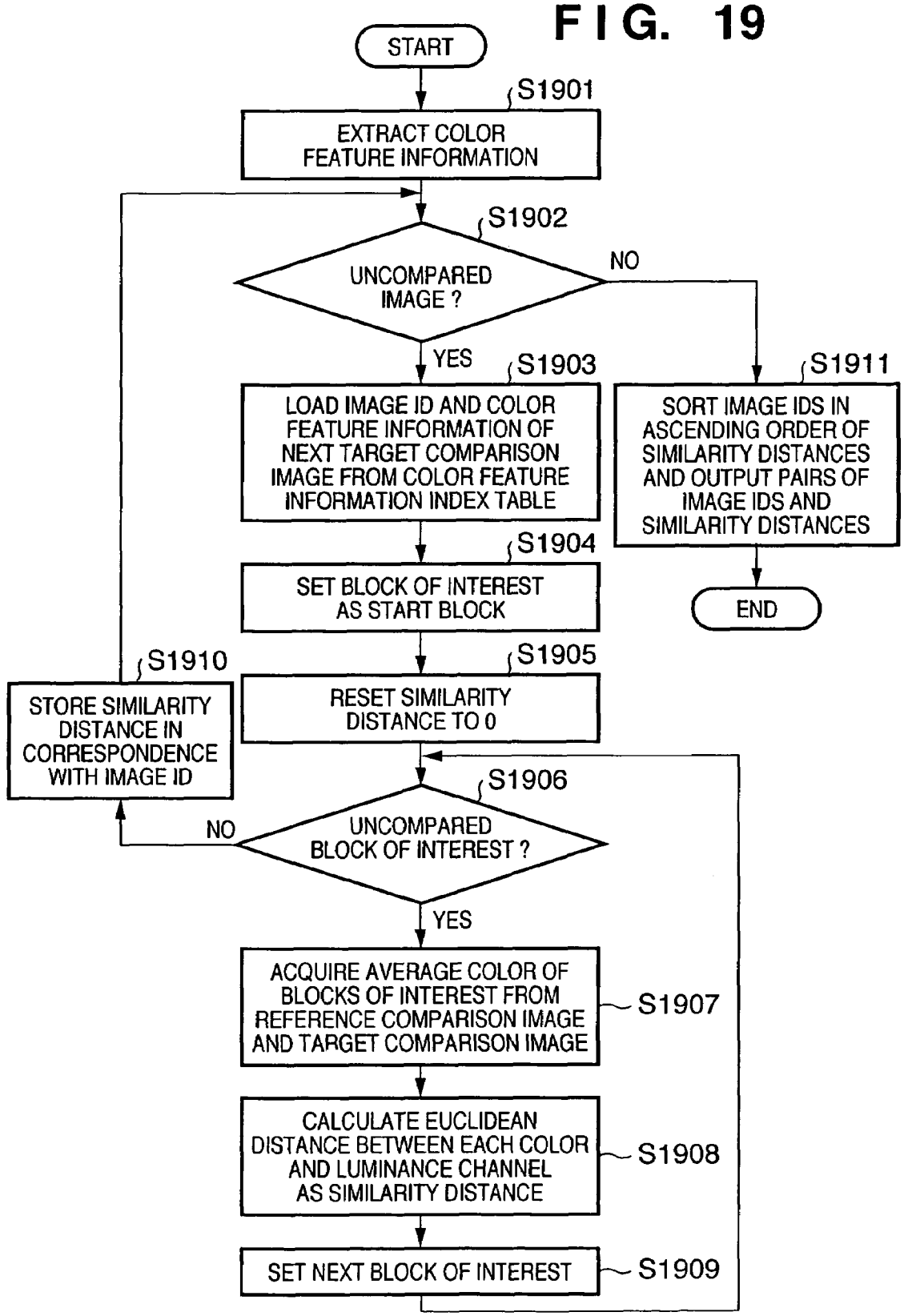
FIG. 19 is a flow chart showing details of the second color feature information comparison process according to the first embodiment of the present invention.

FIG. 19 is a flow chart showing details of the second color feature information comparison process according to the first embodiment of the present invention.

Steps S1902 to S1906, S1910, and S1911 in FIG. 19 correspond to steps S1702 to S1706, S1710, and S1711 in FIG. 17, and a detailed description thereof will be omitted.

In step S1901, the average color is extracted for each block as color feature information of a reference comparison image by the process described with reference to the flow chart of FIG. 13. When the reference comparison image is an image which has already been registered in the image storage 103a, corresponding color feature information is read out from the color feature index table 106a.

After processes in steps S1902 to S1906, the average colors of blocks of interest are acquired from the reference comparison image and target comparison image in step S1907. In step S1908, the euclidean distance of the RGB channel is calculated as a similarity distance.

For the color average value (R0, G0, B0) of a block of interest in the reference comparison image, the color average value (R1, G1, B1) of a block of interest in the target comparison image, and a similarity distance d between the blocks of interest, $$d=\text{sqrt}((R0-R1)*(R0-R1)+(G0-G1)*(G0-G1)+(B0-B1)*(B0-B1)) \quad (4)$$

The calculated similarity distance d is added to the similarity distance calculated in the immediately preceding process. The similarity distance is stored in the memory.

Color feature information comparison method 3 using color feature extraction method 3 will be described.

<Color Feature Information Comparison Method 3>

Figure 20:
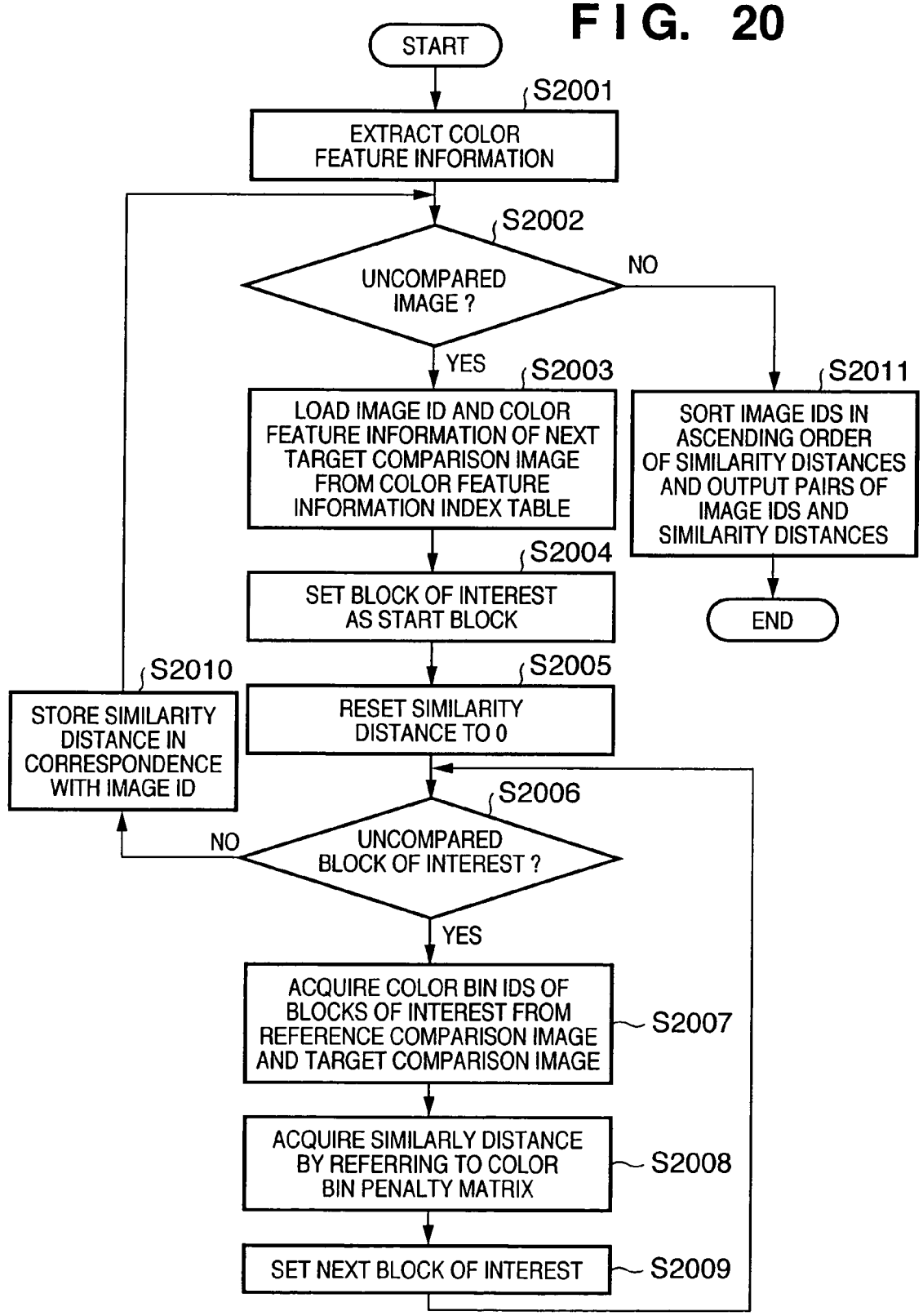
FIG. 20 is a flow chart showing details of the third color feature information comparison process according to the first embodiment of the present invention.

FIG. 20 is a flow chart showing details of the third color feature information comparison process according to the first embodiment of the present invention.

Steps S2002 to S2011 except step S2001 in FIG. 20 correspond to steps S1702 to S1711 in FIG. 17, and a detailed description thereof will be omitted.

In step S2001, the average color of a reference comparison image is calculated for each block by the process described in the flow chart of FIG. 14. A color bin ID corresponding to the average color of each block is extracted as color feature information.

Details of processes executed by the brightness feature information comparison unit 110 will be described.

The brightness feature information comparison unit 110 can appropriately select and execute the following three color feature information comparison methods.

In order to extract color feature information of a reference comparison image, the brightness feature information comparison unit 110 employs one of the above-mentioned brightness feature information extraction methods 1 to 3.

Brightness feature information comparison method 1 using brightness feature extraction method 1 will be first described.

<Brightness Feature Information Comparison Method 1>

Figure 21:
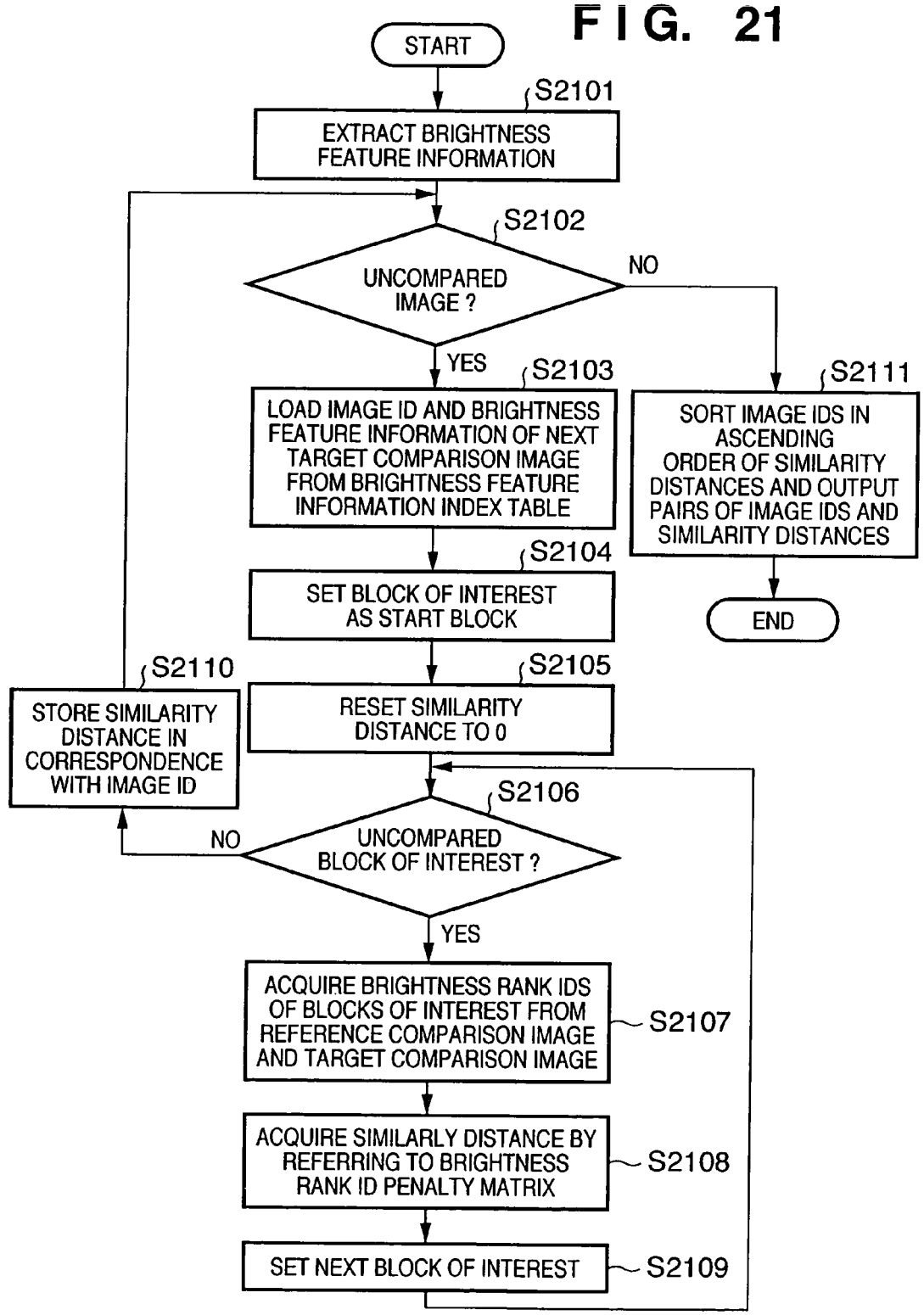
FIG. 21 is a flow chart showing details of the first brightness feature information comparison process according to the first embodiment of the present invention.

FIG. 21 is a flow chart showing details of the first brightness feature information comparison process according to the first embodiment of the present invention.

In step S2101, a brightness rank ID is extracted as brightness feature information of a reference comparison image by the process described in the flow chart of FIG. 5. When the reference comparison image is an image which has already been stored in the image storage 103a, corresponding brightness feature information is read out from the brightness feature information index table 105a.

In step S2102, whether a target comparison image (stored in the image storage 103a) which has not been compared with the reference comparison image exists is determined. If no uncompared image exists (NO in step S2102), the process advances to step S2111. If an uncompared target comparison image exists (YES in step S2102), the process advances to step S2103.

In step S2103, the image ID of an image to be processed and brightness feature information of each block are read out by looking up the brightness feature information index table 105a. In step S2104, a block of interest in the image to be processed is set as the start block. In step S2105, the similarity distance representing the similarity between brightness feature information of the reference comparison image and that of the target comparison image is reset to 0.

In step S2106, whether an uncompared block of interest exists is determined. If no uncompared block of interest exists (NO in. step S2106), the process advances to step S2110. If an uncompared block of interest exists (YES in step S2106), the process advances to step S2107.

In step S2107, the brightness rank IDs of blocks of interest are acquired from brightness feature information of the reference comparison image and that of the target comparison image.

In step S2108, the local similarity distance of the block of interest that corresponds to the interval between the acquired brightness rank IDs is acquired by referring to a brightness rank ID penalty matrix in FIG. 22. The local similarity distance is added to the similarity distance acquired in the immediately preceding process. The similarity distance is stored in the memory.

The brightness rank ID penalty matrix will be explained with reference to FIG. 22.

FIG. 22 is a view showing the structure of the brightness rank ID penalty matrix according to the first embodiment of the present invention.

The brightness rank ID penalty matrix manages the local similarity distance between brightness rank IDs. In FIG. 22, the brightness rank ID penalty matrix is designed such that the similarity distance is 0 for the same brightness rank ID, and as the difference between brightness rank IDs increases, i.e., the similarity decreases, the similarity distance increases. Diagonal positions for the same brightness rank ID have a similarity distance of 0, and brightness rank IDs are symmetrical about the similarity distance of 0.

In the first embodiment, the similarity distance between brightness rank IDs can be acquired only by referring to the brightness rank. ID penalty matrix, attaining high processing speed.

In step S2109, the next block of interest to be processed is set.

If no uncompared block of interest exists in step S2106 (NO in step S2106), the process advances to step S2110 to store the similarity distance stored in the memory in correspondence with the image ID.

If no uncompared image exists in step S2102 (NO in step S2102), the process advances to step S2111. Image IDs are sorted in the ascending order of similarity distances corresponding to image IDs stored in the memory, and pairs of sorted image IDs and similarity distances are output as retrieval results.

Brightness feature information comparison method 2 using brightness feature extraction method 2 will be explained.

<Brightness Feature Information Comparison Method 2>

Figure 23:
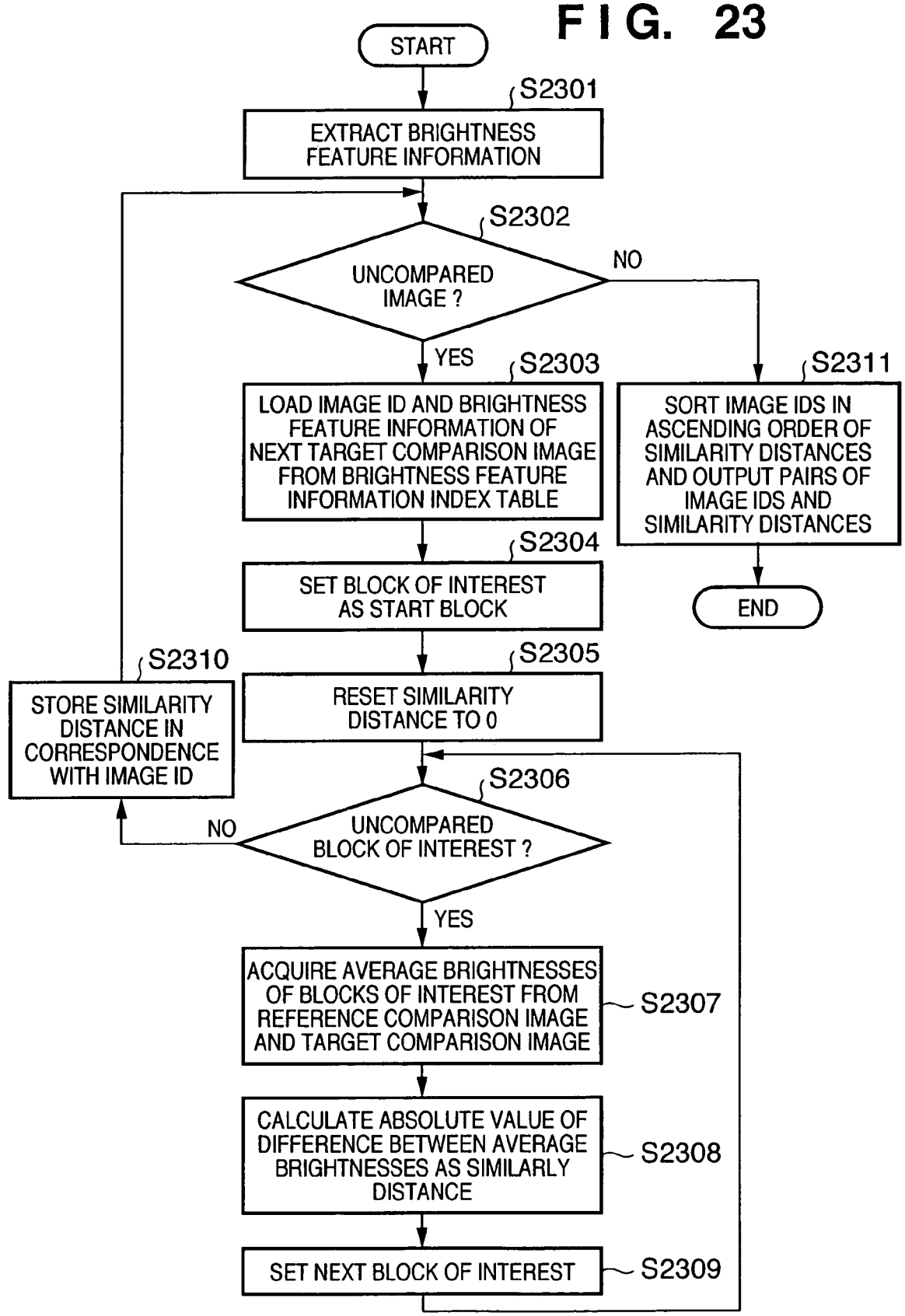
FIG. 23 is a flow chart showing details of the second brightness feature information comparison process according to the first embodiment of the present invention.

FIG. 23 is a flow chart showing details of the second brightness feature information comparison process according to the first embodiment of the present invention.

Steps S2302 to S2306, S2310, and S2311 in FIG. 23 correspond to steps S2102 to S2106, S2110, and S2111 in FIG. 21, and a detailed description thereof will be omitted.

In step S2301, the average brightness is extracted for each block as brightness feature information of a reference comparison image by the process described with reference to the flow chart of FIG. 9. When the reference comparison image is an image which has already been registered in the image storage 103a, corresponding brightness feature information is read out from the brightness feature information index table 105a.

After processes in steps S2302 to S2306, the average brightnesses of blocks of interest are acquired from the reference comparison image and target comparison image in step S2307. In step S2308, the absolute value of the brightness difference between the average brightnesses is calculated as a similarity distance.

For an average brightness Y0 of a block of interest in the reference comparison image, an average brightness Y1 of a block of interest in the target comparison image, and a similarity distance d between the blocks of interest, $$d=\text{abs}(Y0-Y1) \quad (5)$$

The calculated similarity distance d is added to the similarity distance calculated in the immediately preceding process. The similarity distance is stored in the memory.

Brightness feature information comparison method 3 using brightness feature extraction method 3 will be described.

<Brightness Feature Information Comparison Method 3>

Figure 24:
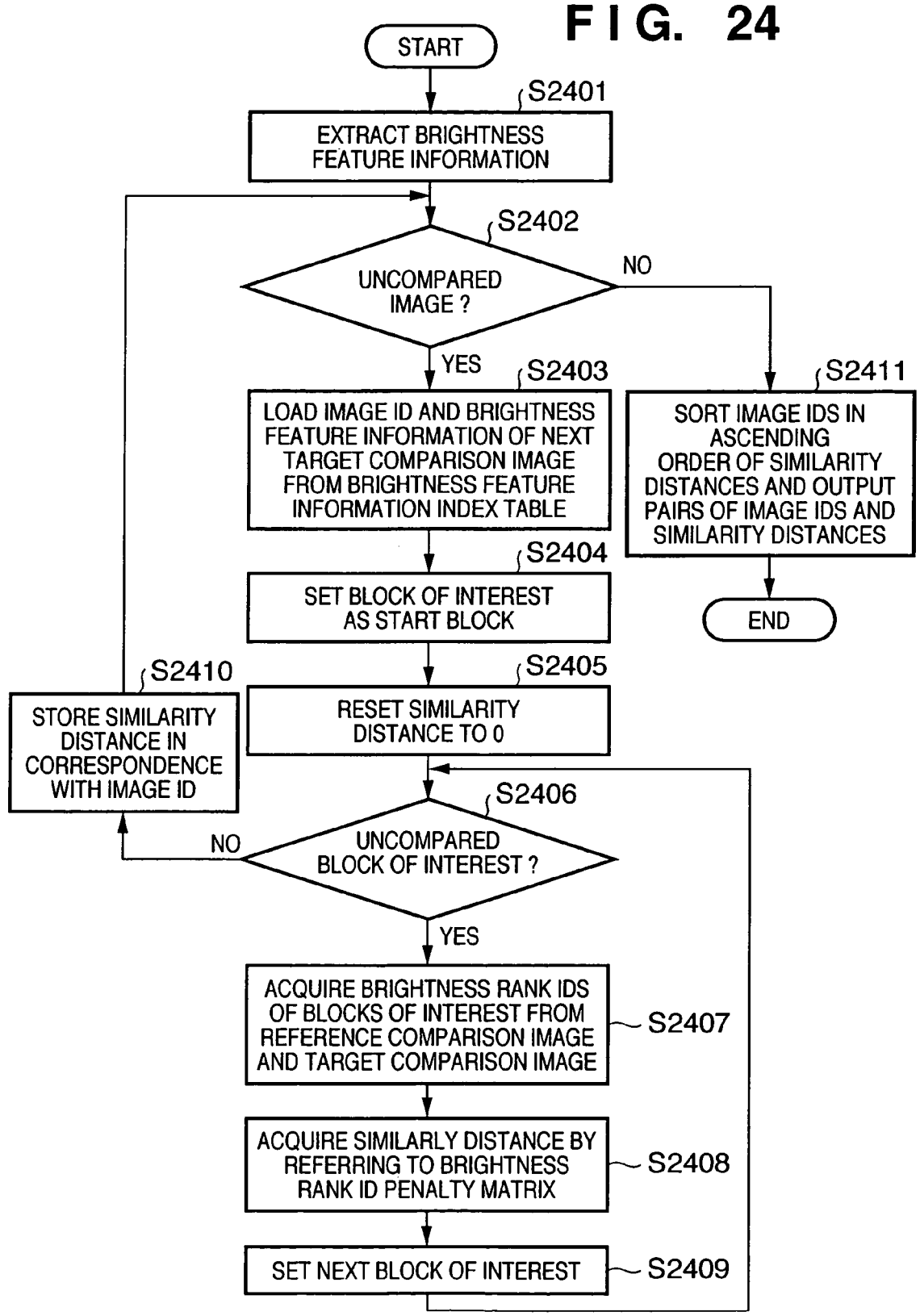
FIG. 24 is a flow chart showing details of the third brightness feature information comparison process according to the first embodiment of the present invention.

FIG. 24 is a flow chart showing details of the third brightness feature information comparison process according to the first embodiment of the present invention.

Steps S2402 to S2411 except step S2401 in FIG. 24 correspond to steps S2102 to S2111 in FIG. 21, and a detailed description thereof will be omitted.

In step S2401, the average brightness of a reference comparison image is calculated for each block by the process described in the flow chart of FIG. 10. A brightness rank ID corresponding to the average brightness of each block is extracted as brightness feature information.

By executing the image registration process and image retrieval process described above, an image can be registered or retrieved using an image feature amount suited to the type of image regardless of whether the target comparison image is a monochrome or grayscale image or a color image.

A retrieval result display process executed by the retrieval result display unit 111 will be explained.

[Retrieval Result Display Process]

In the retrieval result display process, the image management DB 104a is referred to on the basis of information in which pairs of image IDs and their similarities are sorted in the descending order of similarities, i.e., the ascending order of similarity distances. File full path information serving as an image storage destination is acquired from a corresponding record, and a corresponding image is read out from the image storage 103a and displayed.

The retrieval result display process will be explained with reference to FIG. 25.

Figure 25:
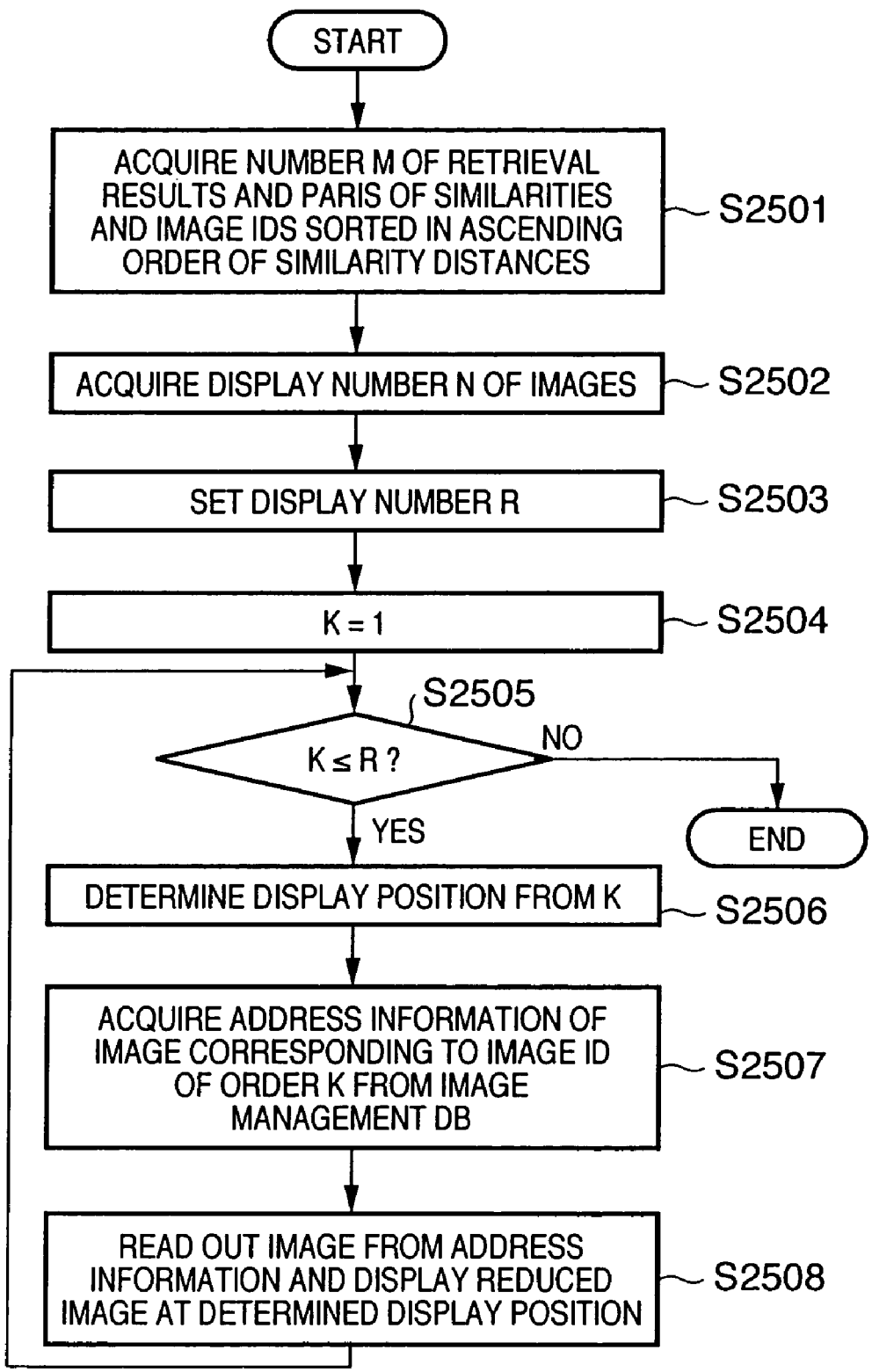
FIG. 25 is a flow chart showing a retrieval result display process according to the first embodiment of the present invention.

FIG. 25 is a flow chart showing the retrieval result display process according to the first embodiment of the present invention.

In step S2501, a number M of retrieval hits serving as the number of retrieval results obtained by the image retrieval process, and pairs of image IDs and their similarities in the descending order of similarities between a reference comparison image and target comparison images attained as retrieval results, i.e., the ascending order of similarity distances are acquired.

In step S2502, a number N of images displayable on the display screen is acquired.

The number N is determined by the size of the reduced image of an image displayed as a retrieval result and the size of a retrieval result display region on the display screen.

In step S2503, a smaller one of the number M of retrieval hits and the number N is set as an image display number R.

In step S2504, a variable K representing the order (read-out image order) of images to be displayed as retrieval results is initialized to 1. In step S2505, whether K≦R is determined. If K≦R is not established (NO in step S2505), the process ends. If K≦R is established (YES in step S2505), the process advances to step S2506.

Processes in steps S2506 to S2508 are to display an image serving as a similar image retrieval result on the display screen.

A display example of the similar image retrieval result will be explained with reference to FIG. 26.

Figure 26:
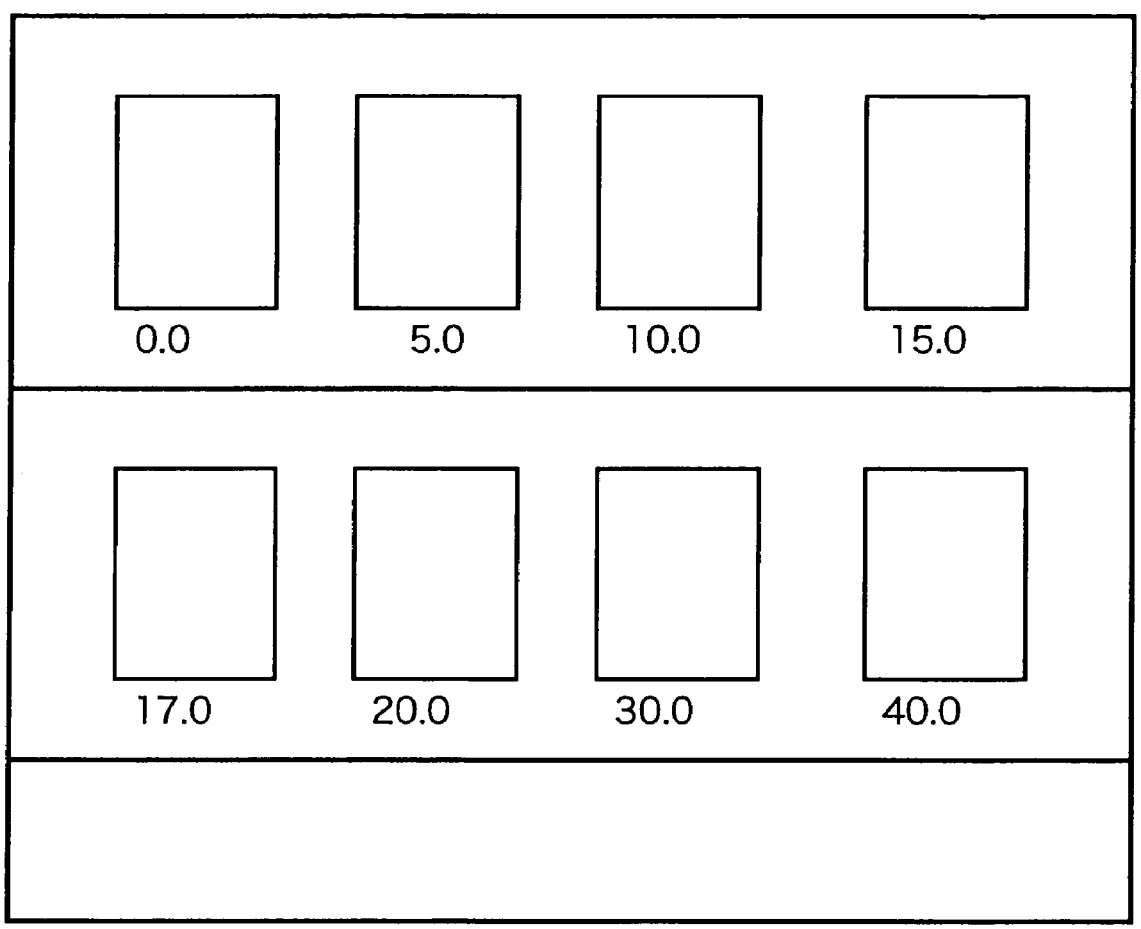
FIG. 26 is a view showing a display example of a similar image retrieval result according to the first embodiment of the present invention.

FIG. 26 is a view showing a display example of the similar image retrieval result according to the first embodiment of the present invention.

As shown in FIG. 26, the reduced images of images as retrieval results are displayed sequentially right adjacent to preceding reduced images from the upper left in the ascending order of similarity distances in the retrieval result display region on the display screen. When a reduced image reaches the upper right end, the next reduced image is arranged at the left end on the next row. From this position, reduced images are displayed sequentially right adjacent to preceding reduced images till the right end. Similarly, reduced images are displayed up to the lower right end at the end of the retrieval result display region. Reduced images are displayed together with corresponding similarity distances.

In step S2506, the display position of an image to be displayed is determined from the readout image order K. In step S2507, address information (full path information) corresponding to the image ID of the readout image order K is acquired from the image management DB 104a. In step S2508, an image indicated by the address information is read out, and the reduced image is displayed at the determined display position. After that, the variable K is incremented by one, and the process advances to step S2505.

The image retrieval process of the first embodiment pays attention to only whether color information of a reference comparison image is sufficient. When color information of the reference comparison image is sufficient, a similarity comparison with color feature information of the reference comparison image and that of a target comparison image is performed. If color information of the reference comparison image is insufficient, a similarity comparison between brightness feature information of the reference comparison image and that of a target comparison image is done. However, the present invention is not limited to this similar image retrieval example.

For example, whether color information of a target comparison image is sufficient may also be taken into consideration. If pieces of color information of both images to be compared are sufficient, a similarity comparison is executed using the pieces of color information. If either or both of the pieces of color information are insufficient, a similarity comparison is done using pieces of brightness feature information of the two images, thereby performing similar image retrieval.

The image registration process is done in an order of the image input process, image storage process, image management information process, brightness feature information extraction process, and color feature information extraction process. However, the processes after the image input processes may be performed in an arbitrary order.

In the image retrieval process, when a reference comparison image is an image which has already been stored in the image storage 103a, its color feature information and brightness feature information have already been registered. The color feature information extraction process and brightness feature information extraction process for the image can be omitted.

The image management DB 104a, brightness feature information index table 105a, and color feature information index table 106a are separately configured, and their pieces of information are made to correspond to each other by using an image ID. Alternatively, the DB and tables may be integrated.

Setting of a block of interest to be processed is not limited to the scanning order represented by the order decision table of FIG. 7. Any scanning order such as horizontal scanning, vertical scanning, or zigzag scanning can be adopted as far as each block of an image can be set as a block of interest.

According to the first embodiment described above, similar image retrieval is executed by adaptively switching the retrieval method in accordance with the types of images to be processed (target comparison image and reference comparison image). This embodiment can realize similar image retrieval which compensates for the disadvantages of conventional color information retrieval and brightness information retrieval and exploits their advantages.

Second Embodiment

Figure 27:
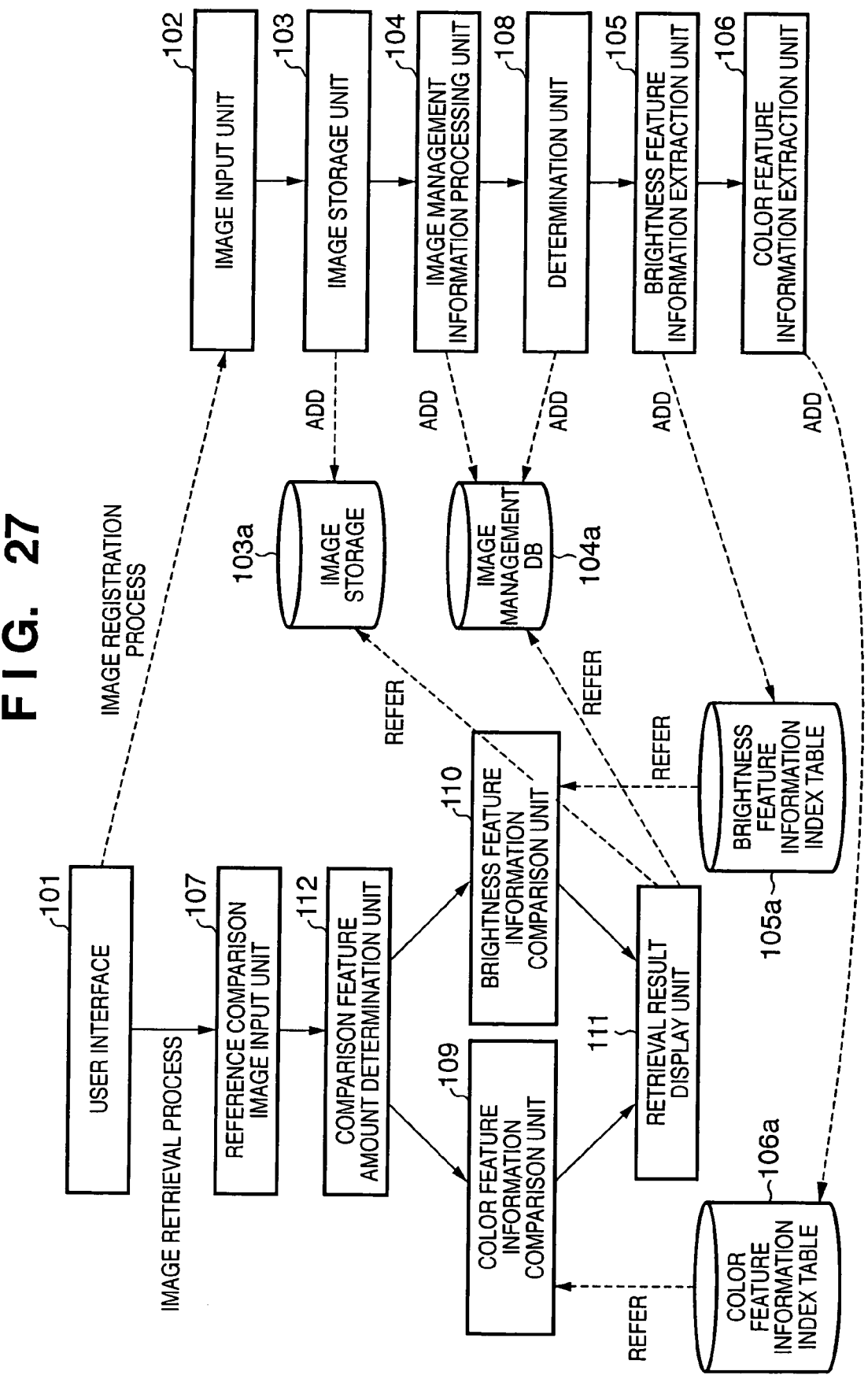
FIG. 27 is a block diagram showing an image processing apparatus according to the second embodiment of the present invention.

The second embodiment is a modification to the first embodiment. Particularly in the second embodiment, as shown in FIG. 27, the process of the determination unit 108 in FIG. 1 according to the first embodiment is executed in the image registration process, a reference comparison image serving as a retrieval condition is selected and input from images stored an image storage 103a, and the process of a comparison feature amount determination unit 112 added as a new building component is executed in the image retrieval process.

Part of the second embodiment different from the first embodiment will be explained.

A determination unit 108 in the second embodiment determines whether color information of an input target comparison image is sufficient. This determination method is the same as that in the first embodiment. In the second embodiment, whether a color information flag representing a determination result (1 for sufficient color information and 0 for insufficient color information) is stored in an image management DB 104a in correspondence with an image ID to be registered, the file name of the image, and the image input date.

FIG. 28 shows an example of the structure of the image management DB 104a.

To perform an image retrieval process according to the second embodiment, a reference comparison image input unit 107 designates a reference comparison image serving as a retrieval condition via an operation window provided by a UI 101.

The comparison feature amount determination unit 112 acquires the color information flag of a designated reference comparison image by referring to the image management DB 104a, and when the color information flag represents 1, determines to execute the process of a color feature information comparison unit 109. When the color information flag represents 0, the comparison feature amount determination unit 112 determines to execute the process of a brightness feature information comparison unit 110. The process of the color feature information comparison unit 109 or brightness feature information comparison unit 110 described in the first embodiment is executed in accordance with the determination.

In the second embodiment, a color feature information extraction process and brightness feature information extraction process respectively performed by the color feature information comparison unit 109 and brightness feature information comparison unit 110 are completed by merely reading out color feature information and brightness feature information of an image to be processed that are stored in the image management DB 104a.

In the image retrieval process of the second embodiment, attention is given to only whether color information of a reference comparison image is sufficient. The color information flag of the reference comparison image in the image management DB 104a is referred to, and when the color information is sufficient, a similarity comparison between color feature information of the reference comparison image and that of a target comparison image is done. When the color information is insufficient, a similarity comparison between brightness feature information of the reference comparison image and that of the target comparison image is performed. However, the present invention is not limited to this similar image retrieval.

For example, whether color information of a target comparison image is sufficient may also be considered. If pieces of color information of both images to be compared are sufficient, a similarity comparison is executed using the pieces of color information. If either or both of the pieces of color information are insufficient, a similarity comparison is done using pieces of brightness feature information of the two images, thereby performing similar image retrieval.

The image registration process, image input process, image storage process, image management information process, determination process, brightness feature information extraction process, and color feature information extraction process are performed in the order named. However, the processes after the image input processes may be performed in an arbitrary order.

The image management DB 104a, a brightness feature information index table 105a, and a color feature information index table 106a are separately configured, and their pieces of information are made to correspond to each other by using an image ID. Alternatively, the DB and tables may be integrated.

In addition to the effects of the first embodiment, according to the second embodiment, a color information flag representing whether color information of an image to be registered is sufficient is stored in advance together with the image in the image registration process. In the image retrieval process, the registered image is utilized as a reference comparison image serving as a retrieval condition, and also the color information flag is used to determine whether color information of the reference comparison image is sufficient. Compared to the first embodiment, the second embodiment can more efficiently execute a process.

The image processing apparatus in the above-described first and second embodiments can be implemented by an information processing apparatus such as a personal computer or can be interpreted as an invention of a method serving as procedures which realize the functions of the image processing apparatus. Since the image processing apparatus can be realized by a computer, the present invention can be apparently applied to a computer program running in each apparatus, and also a computer-readable storage medium such as a CD-ROM which stores the computer program and allows a computer to load it.

The embodiments have been described in detail above. The present invention can take claims of a system, apparatus, method, program, storage medium, and the like. More specifically, the present invention may be applied to a system including a plurality of devices or an apparatus formed by a single device.

The present invention is also achieved by supplying a software program (in the above embodiments, programs corresponding to flow charts shown in the drawings) for realizing the functions of the above-described embodiments to a system or apparatus directly or from a remote place, and reading out and executing the supplied program codes by the computer of the system or apparatus.

Hence, the present invention is realized by program codes installed in the computer in order to realize the functional processes of the present invention by the computer. That is, the present invention includes a computer program for realizing the functional processes of the present invention.

In this case, the present invention can take any program form such as an object code, a program executed by an interpreter, or script data supplied to an OS as long as a program function is attained.

A recording medium for supplying the program includes a floppy® disk, hard disk, optical disk, magnetooptical disk, MO, CD-ROM, CD-R, CD-RW, magnetic tape, nonvolatile memory card, ROM, and DVD (DVD-ROM and DVD-R).

As another program supply method, the program can also be supplied by connecting a client computer to an Internet Web page via the browser of the client computer, and downloading the computer program of the present invention or a compressed file containing an automatic installing function from the Web page to a recording medium such as a hard disk. The program can also be realized by grouping program codes which form the program of the present invention into a plurality of files, and downloading the files from different Web pages. That is, the present invention also includes a WWW server which allows a plurality of users to download the program files for realizing the functional processes of the present invention by a computer.

The program of the present invention can also be encrypted, stored in a storage medium such as a CD-ROM, and distributed to the user. A user who satisfies predetermined conditions is prompted to download decryption key information from a Web page via the Internet. The user executes the encrypted program by using the key information, and installs the program in the computer.

The functions of the above-described embodiment are realized when the computer executes the readout program. Also, the functions of the above-described embodiments are realized when an OS or the like running on the computer performs some or all of actual processes on the basis of the instructions of the program.

The functions of the above-described embodiments are also realized when the program read out from the storage medium are written in the memory of a function expansion board inserted into the computer or the memory of a function expansion unit connected to the computer, and then the CPU of the function expansion board or function expansion unit performs some or all of actual processes on the basis of the instructions of the program.

As has been described above, the present invention can provide an image processing technique capable of retrieving an image at high precision regardless of the type of image.

The present invention is not limited to the above embodiments and various changes and modifications can be made within the spirit and scope of the present invention. Therefore, to appraise the public of the scope of the present invention, the following claims are made.

What is claimed is:

1. An image processing apparatus which retrieves a similar image on the basis of a similarity between a reference comparison image serving as a retrieval condition and a target comparison image, comprising:
   brightness feature information extraction means for extracting brightness feature information on a brightness of an image to be processed;
   color feature information extraction means for extracting color feature information on a color of the image to be processed;
   determination means for determining whether color information of the image to be processed is sufficient;
   comparison means for, when color information of the reference comparison image is sufficient as a result of determination by said determination means, performing a similarity comparison between color feature information of the reference comparison image and color feature information of the target comparison image, and when the color information of the reference comparison image is insufficient, performing a similarity comparison between brightness feature information of the reference comparison image and brightness feature information of the target comparison image; and
   output means for outputting an image serving as a retrieval result on the basis of a comparison result of said comparison means.

2. The apparatus according to claim 1, wherein when the color information of the reference comparison image and color information of the target comparison image are sufficient as a result of determination by said determination means, said comparison means performs a similarity comparison between the color feature information of the reference comparison image and the color feature information of the target comparison image, and when at least one of the color information of the reference comparison image and the color information of the target comparison image is insufficient, performs a similarity comparison between the brightness feature information of the reference comparison image and the brightness feature information of the target comparison image.

3. The apparatus according to claim 1, wherein
   said determination means comprises analysis means for analyzing a color of a pixel of the reference comparison image, and
   said determination means determines whether the color information of the reference comparison image is sufficient, on the basis of an analysis result of said analysis means.

4. The apparatus according to claim 1, wherein when a data format of the reference comparison image corresponds to a color image, said determination means determines that the color information of the reference comparison image is sufficient, and when the data format corresponds to a monochrome or grayscale image, determines that the color information of the reference comparison image is insufficient.

5. The apparatus according to claim 3, wherein said analysis means analyzes a ratio of the color information to the reference comparison image.

6. The apparatus according to claim 3, wherein said analysis means analyzes a ratio of a color difference component value to a luminance component value in an average color of all pixels which form the reference comparison image or a reduced image of the reference comparison image.

7. The apparatus according to claim 3, wherein said analysis means comprises
   generation means for generating a color histogram of color bins by projecting density values of all pixels which form the reference comparison image or a reduced image of the reference comparison image, into the color bins serving as subspaces prepared by dividing a color space, and
   calculation means for calculating a ratio of the number of pixels belonging to a color bin in a grayscale direction to a total number of pixels of the reference companson image.

8. The apparatus according to claim 1, wherein the brightness feature information includes information which makes a brightness rank corresponding to a mode brightness in a brightness histogram in each block prepared by segmenting the reference comparison image into a plurality of blocks and position information of the block correspond to each other.

9. The apparatus according to claim 1, wherein the brightness feature information includes information which makes an average brightness in each block prepared by segmenting the reference comparison image into a plurality of blocks and position information of the block correspond to each other.

10. The apparatus according to claim 1, wherein the brightness feature information includes information which makes a brightness rank corresponding to an average brightness in each block prepared by segmenting the reference comparison image into a plurality of blocks and position information of the block correspond to each other.

11. The apparatus according to claim 1, wherein the color feature information includes information which makes a color bin TD corresponding to a mode color in a color histogram in each block prepared by segmenting the reference comparison image into a plurality of blocks and position information of the block correspond to each other.

12. The apparatus according to claim 1, wherein the color feature information includes information which makes an average color in each block prepared by segmenting the reference comparison image into a plurality of blocks and position information of the block correspond to each other.

13. The apparatus according to claim 1, wherein the color feature information includes information which makes a color bin ID corresponding to an average color in each block prepared by segmenting the reference comparison image into a plurality of blocks and position information of the block correspond to each other.

14. The apparatus according to claim 1, wherein
said brightness feature information extraction means extracts the brightness feature information on the basis of a histogram obtained by ranking or quantizing a brightness histogram of each block prepared by segmenting the reference comparison image into a plurality of blocks,
said color feature information extraction means extracts the color feature information on the basis of a color histogram of color bins obtained by projecting density values of all pixels which form each block prepared by segmentation into a plurality of blocks, into color bins serving as subspaces prepared by dividing a color space, and
the number of ranks or the number of quantization steps in ranking or quantization by said brightness feature information extraction means is larger than the number of bins in a grayscale direction of the color bins in said color feature information extraction means.

15. The apparatus according to claim 1, wherein said color feature information extraction means extracts color feature information on the color of the reference comparison image even when the reference comparison image serving as the image to be processed is a monochrome or grayscale image.

16. The apparatus according to claim 1, further comprising registration means for registering an image serving as the reference comparison image in an image storage,
wherein when the reference comparison image serving as the image to be processed is a monochrome or grayscale image, said color feature information extraction means extracts color feature information on a color of a converted image obtained by converting the reference comparison image into a color image.

17. The apparatus according to claim 1, wherein
said brightness feature information extraction means extracts the brightness feature information for each block prepared by segmenting the image to be processed into a plurality of blocks, and
numbers of vertical and horizontal segmented blocks are equal to each other regardless of an aspect ratio and a size of the image to be processed.

18. The apparatus according to claim 1, wherein
said color feature information extraction means extracts the color feature information for each block prepared by segmenting the image to be processed into a plurality of blocks, and
numbers of vertical and horizontal segmented blocks are equal to each other regardless of an aspect ratio and a size of the image to be processed.

19. The apparatus according to claim 1, further comprising storage means for storing an image which is made to correspond to a color information flag representing whether the color information is sufficient,
wherein when the reference comparison image is stored in said storage means, said determination means determines whether the color information of the reference comparison image is sufficient, on the basis of the color information flag corresponding to the reference comparison image.

20. The apparatus according to claim 19, further comprising designation means for designating the reference comparison image from an image stored in said storage means.

21. A computer-readable medium storing a program which is executable on a computer and which realizes an image process of performing an image registration process for an image subjected to similar image retrieval, said program comprising:
a program code for an input step of inputting an image;
a program code for a generation step of generating management information for managing the image;
a program code for a brightness feature information extraction step of extracting brightness feature information on a brightness of the image;
a program code for a color feature information extraction step of extracting color feature information on a color of the image;
a program code for a storage step of storing the image, the management information, the brightness feature information, and the color feature information in a storage medium in correspondence with each other; and
a program code for a determination step for determining whether determination step for determining whether color information of the image is sufficient,
wherein said storage step stores the image in correspondence with a color information flag representing whether the color information obtained by a determination result of said determination step is sufficient.

22. An image processing apparatus which performs an image registration process for an image subjected to similar image retrieval, comprising:
input means for inputting an image;
generation means for generating management information for managing the image;
brightness feature information extraction means for extracting brightness feature information on a brightness of the image;
color feature information extraction means for extracting color feature information on a color of the image;

storage means for storing the image, the management information, the brightness feature information, and the color feature information in correspondence with each other; and determination means for determining whether color information of the image is sufficient, wherein said storage means stores the image in correspondence with a color information flag representing whether the color information obtained by a determination result of said determination means is sufficient.

23. An image processing method of retrieving a similar image on the basis of a similarity between a reference comparison image serving as a retrieval condition and a target comparison image, comprising:

a brightness feature information extraction step of extracting brightness feature information on a brightness of an image to be processed;

a color feature information extraction step of extracting color feature information on a color of the image to be processed;

a determination step of determining whether color information of the image to be processed is sufficient;

a comparison step of, when color information of the reference comparison image is sufficient as a result of determination in the determination step, performing a similarity comparison between color feature information of the reference comparison image and color feature information of the target comparison image, and when the color information of the reference comparison image is insufficient, performing a similarity comparison between brightness feature information of the reference comparison image and brightness feature information of the target comparison image; and an output step of outputting an image serving as a retrieval result on the basis of a comparison result of the comparison step.

24. An image processing method of performing an image registration process for an image subjected to similar image retrieval, comprising:

an input step of inputting an image;

a generation step of generating management information for managing the image;

a brightness feature information extraction step of extracting brightness feature information on a brightness of the image;

a color feature information extraction step of extracting color feature information on a color of the image;

a storage step of storing the image, the management information, the brightness feature information, and the color feature information in a storage medium in correspondence with each other; and a determination step for determining whether color information of the image is sufficient.

wherein said storage step stores the image in correspondence with a color information flag representing whether the color information obtained by a determination result of said determination step is sufficient.

25. A computer-readable medium storing a program which is executable on a computer and which realizes an image process of retrieving a similar image on the basis of a similarity between a reference comparison image serving as a retrieval condition and a target comparison image, said program comprising:

a program code for a brightness feature information extraction step of extracting brightness feature information on a brightness of an image to be processed;

a program code for a color feature information extraction step of extracting color feature information on a color of the image to be processed;

a program code for a determination step of determining whether color information of the image to be processed is sufficient;

a program code for a comparison step of, when color information of the reference comparison image is sufficient as a result of determination in the determination step, performing a similarity comparison between color feature information of the reference comparison image and color feature information of the target comparison image, and when the color information of the reference comparison image is insufficient, performing a similarity comparison between brightness feature information of the reference comparison image and brightness feature information of the target comparison image;

a program code for an output step of outputting an image serving as a retrieval result on the basis of a comparison result of the comparison step.

* * * * *

UNITED STATES PATENT AND TRADEMARK OFFICE
CERTIFICATE OF CORRECTION

| | |
|---|---|
| PATENT NO. | : 7,305,151 B2 |
| APPLICATION NO. | : 10/828175 |
| DATED | : December 4, 2007 |
| INVENTOR(S) | : Hirotaka Shiiyama |

It is certified that error appears in the above-identified patent and that said Letters Patent is hereby corrected as shown below:

<u>COLUMN 10</u>

Line 36, "bmicolors" should read --bmiColors--.

<u>COLUMN 12</u>

Line 26, "if of" should read --of--.

<u>COLUMN 20</u>

Line 22, "rank." should read --rank--.

<u>COLUMN 23</u>

Line 19, "an" should read --in--.

<u>COLUMN 25</u>

Line 52, "appraise" should read --apprise--.

<u>COLUMN 27</u>

Line 20, "TD" should read --ID--.

UNITED STATES PATENT AND TRADEMARK OFFICE
CERTIFICATE OF CORRECTION

| | |
|---|---|
| PATENT NO. | : 7,305,151 B2 |
| APPLICATION NO. | : 10/828175 |
| DATED | : December 4, 2007 |
| INVENTOR(S) | : Hirotaka Shiiyama |

It is certified that error appears in the above-identified patent and that said Letters Patent is hereby corrected as shown below:

<u>COLUMN 30</u>

Line 8, "sufficient." should read --sufficient,--.

Signed and Sealed this

Thirtieth Day of September, 2008

JON W. DUDAS
*Director of the United States Patent and Trademark Office*